(12) United States Patent
Sizelove

(10) Patent No.: US 8,734,256 B2
(45) Date of Patent: May 27, 2014

(54) SYSTEM AND METHOD FOR HOSTING MULTIPLAYER GAMES

(75) Inventor: Steven Lee Sizelove, Woodinville, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 761 days.

(21) Appl. No.: 12/896,192

(22) Filed: Oct. 1, 2010

(65) Prior Publication Data

US 2011/0143835 A1 Jun. 16, 2011

Related U.S. Application Data

(63) Continuation-in-part of application No. 12/210,689, filed on Sep. 15, 2008, now Pat. No. 8,547,340.

(60) Provisional application No. 61/278,167, filed on Oct. 2, 2009.

(51) Int. Cl.
*A63F 13/00* (2014.01)

(52) U.S. Cl.
USPC .................................. 463/42; 463/31; 463/37

(58) Field of Classification Search
USPC .............................. 463/16, 20, 31, 36, 37, 42
See application file for complete search history.

(56) References Cited

U.S. PATENT DOCUMENTS

| | | | |
|---|---|---|---|
| 3,037,812 A | 6/1962 | Monroe | |
| 4,584,603 A | 4/1986 | Harrison | |
| 4,866,515 A | 9/1989 | Tagawa et al. | |
| 4,897,714 A | 1/1990 | Ichise et al. | |
| 5,177,616 A | 1/1993 | Riday | |
| 5,295,089 A | 3/1994 | Ambasz | |
| 5,311,302 A | 5/1994 | Berry et al. | |
| 5,469,363 A | 11/1995 | Saliga | |
| 5,555,466 A | 9/1996 | Scribner et al. | |
| 5,568,484 A | 10/1996 | Margis | |
| 5,596,647 A | 1/1997 | Wakai et al. | |

(Continued)

FOREIGN PATENT DOCUMENTS

| | | |
|---|---|---|
| CN | ZL200520103236.4 | 12/2006 |
| EP | 0577054 A | 1/1994 |

(Continued)

OTHER PUBLICATIONS

CN, Office Action, Appl. No. 200880107132.7, Jul. 22, 2011.

(Continued)

*Primary Examiner* — James S McClellan
(74) *Attorney, Agent, or Firm* — Orrick, Herrington & Sutcliffe LLP

(57) ABSTRACT

A multiplayer gaming system and methods for manufacturing and using same. The multiplayer game has game indicia and a plurality of game elements including one or more exposed game elements and at least one concealed game element associated with each player. Video interface systems are disposed at respective player seats and present different perspective views of the game indicia and the exposed game elements to the players. The multiplayer gaming system likewise includes a plurality of handheld player control devices that provide a customized game interface for presenting the concealed game element to the associated player while inhibiting other players from viewing the concealed game element and for enabling the player to actively control his participation in the multiplayer game. The multiplayer gaming system thereby simulates an experience of physically participating in a tangible game.

20 Claims, 28 Drawing Sheets

(56) References Cited

U.S. PATENT DOCUMENTS

| | | |
|---|---|---|
| 5,617,331 A | 4/1997 | Wakai et al. |
| 5,640,002 A | 6/1997 | Ruppert et al. |
| 5,701,582 A | 12/1997 | DeBey |
| 5,709,448 A | 1/1998 | Jennings et al. |
| 5,760,819 A | 6/1998 | Sklar et al. |
| 5,790,175 A | 8/1998 | Sklar et al. |
| 5,790,787 A | 8/1998 | Scott et al. |
| 5,831,664 A | 11/1998 | Wharton |
| 5,835,127 A | 11/1998 | Booth et al. |
| 5,857,869 A | 1/1999 | Parcel et al. |
| 5,889,268 A | 3/1999 | Swartz |
| 5,889,775 A | 3/1999 | Sawicz et al. |
| 5,953,429 A | 9/1999 | Wakai et al. |
| 5,959,596 A | 9/1999 | McCarten et al. |
| 5,966,442 A | 10/1999 | Sachdev |
| 5,971,840 A | 10/1999 | Falciglia |
| 5,973,722 A | 10/1999 | Wakai et al. |
| 5,990,928 A | 11/1999 | Sklar et al. |
| 6,003,008 A | 12/1999 | Postrel et al. |
| 6,058,288 A | 5/2000 | Reed et al. |
| 6,129,274 A | 10/2000 | Suzuki |
| 6,135,549 A | 10/2000 | Demick et al. |
| 6,151,497 A | 11/2000 | Yee et al. |
| 6,154,186 A | 11/2000 | Smith et al. |
| 6,177,887 B1 | 1/2001 | Jerome |
| 6,201,797 B1 | 3/2001 | Leuca et al. |
| 6,208,307 B1 | 3/2001 | Frisco et al. |
| 6,249,913 B1 | 6/2001 | Galipeau et al. |
| 6,338,045 B1 | 1/2002 | Pappas |
| 6,390,920 B1 | 5/2002 | Infiesto et al. |
| 6,487,540 B1 | 11/2002 | Smith et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,529,706 B1 | 3/2003 | Mitchell |
| 6,540,614 B1 | 4/2003 | Nishino et al. |
| 6,549,754 B1 | 4/2003 | Miller et al. |
| 6,559,812 B1 | 5/2003 | McCarten et al. |
| 6,574,338 B1 | 6/2003 | Sachdev |
| 6,598,227 B1 | 7/2003 | Berry et al. |
| 6,600,418 B2 | 7/2003 | Francis et al. |
| 6,609,103 B1 | 8/2003 | Kolls |
| 6,622,124 B1 | 9/2003 | Kolls |
| 6,637,484 B1 | 10/2003 | Kraft |
| 6,643,510 B2 | 11/2003 | Taylor |
| 6,661,353 B1 | 12/2003 | Gopen |
| 6,693,236 B1 | 2/2004 | Gould et al. |
| 6,702,604 B1 | 3/2004 | Moscovitch |
| 6,736,315 B2 | 5/2004 | Swartz |
| 6,757,712 B1 | 6/2004 | Bastian et al. |
| 6,796,495 B2 | 9/2004 | Stahl et al. |
| 6,810,527 B1 | 10/2004 | Conrad |
| 6,876,905 B2 | 4/2005 | Farley et al. |
| 6,884,171 B2 | 4/2005 | Eck et al. |
| 6,899,390 B2 | 5/2005 | Sanfrod et al. |
| 6,951,020 B2 | 9/2005 | Ricciardi |
| 6,990,338 B2 | 1/2006 | Miller et al. |
| 7,036,889 B2 | 5/2006 | Sanfrod et al. |
| 7,100,187 B2 | 8/2006 | Pierzga et al. |
| 7,124,426 B1 | 10/2006 | Tsuria et al. |
| 7,177,638 B2 | 2/2007 | Funderburk et al. |
| 7,278,920 B1 | 10/2007 | Klamer et al. |
| 7,280,825 B2 | 10/2007 | Keen et al. |
| 7,454,203 B2 | 11/2008 | Levitan |
| 7,483,696 B1 | 1/2009 | Mitchell |
| 7,496,361 B1 | 2/2009 | Mitchell et al. |
| 2002/0045484 A1* | 4/2002 | Eck et al. ............... 463/42 |
| 2002/0059363 A1 | 5/2002 | Katz et al. |
| 2002/0094829 A1 | 7/2002 | Ritter |
| 2002/0095680 A1 | 7/2002 | Davidson |
| 2002/0178451 A1 | 11/2002 | Ficco |
| 2003/0003899 A1 | 1/2003 | Tashiro et al. |
| 2003/0033351 A1 | 2/2003 | Ricciardi |
| 2003/0107248 A1 | 6/2003 | Sanford et al. |
| 2003/0148736 A1 | 8/2003 | Wright et al. |
| 2003/0169563 A1 | 9/2003 | Adams |
| 2004/0077308 A1 | 4/2004 | Sanford et al. |
| 2004/0098745 A1 | 5/2004 | Marston et al. |
| 2004/0139159 A1 | 7/2004 | Ricciardi et al. |
| 2004/0167967 A1 | 8/2004 | Bastian et al. |
| 2004/0183346 A1 | 9/2004 | Sanford et al. |
| 2005/0044564 A1 | 2/2005 | Stopniewicz |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0202785 A1 | 9/2005 | Meyer |
| 2005/0216938 A1* | 9/2005 | Brady et al. ............... 725/76 |
| 2005/0239261 A1 | 10/2005 | Tai et al. |
| 2005/0256616 A1 | 11/2005 | Rhoads |
| 2006/0032979 A1 | 2/2006 | Mitchell et al. |
| 2006/0058082 A1* | 3/2006 | Crawford et al. ............... 463/7 |
| 2006/0068917 A1 | 3/2006 | Snoddy et al. |
| 2006/0088001 A1 | 4/2006 | Reitmann et al. |
| 2006/0107295 A1 | 5/2006 | Margis et al. |
| 2006/0174285 A1 | 8/2006 | Brady, Jr. et al. |
| 2006/0197750 A1 | 9/2006 | Kerr |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0256090 A1* | 11/2006 | Huppi ............... 345/173 |
| 2006/0258446 A1* | 11/2006 | Nguyen et al. ............... 463/30 |
| 2006/0270373 A1 | 11/2006 | So |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0021203 A1 | 1/2007 | Edwards |
| 2007/0022018 A1 | 1/2007 | Suryanarayana et al. |
| 2007/0037625 A1 | 2/2007 | Edwards |
| 2007/0044126 A1 | 2/2007 | Mitchell |
| 2007/0167239 A1* | 7/2007 | O'Rourke ............... 463/42 |
| 2008/0023600 A1 | 1/2008 | Perlman |
| 2008/0040756 A1 | 2/2008 | Perlman |
| 2008/0090632 A1* | 4/2008 | Kumar ............... 463/16 |
| 2008/0124054 A1 | 5/2008 | Bonar |
| 2008/0127278 A1 | 5/2008 | Bonar |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| JP | 58-46485 | 3/1983 |
| JP | 62-238693 | 10/1987 |
| WO | WO 99/14655 A | 3/1999 |
| WO | WO 00/14987 A1 | 3/2000 |
| WO | WO 03/024110 A1 | 3/2003 |
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2006/062641 A2 | 6/2006 |
| WO | WO 2006/065381 A2 | 6/2006 |

OTHER PUBLICATIONS

US, Office Action, U.S. Appl. No. 10/773,523, Oct. 5, 2006.
US, Office Action, U.S. Appl. No. 09/952,629, Mar. 14, 2006.
US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance, U.S. Appl. No. 09/811,317, Jul. 14, 2003.
US, Office Action, U.S. Appl. No. 08/863,448, Sep. 24, 1997.
US, Office Action, U.S. Appl. No. 08/863,448, Apr. 27, 1998.
US, Notice of Allowance, U.S. Appl. No. 08/863,448, Feb. 17, 1999.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.

(56) References Cited

OTHER PUBLICATIONS

US, Office Action, U.S. Appl. No. 08/479,654, Aug. 5, 1997.
US, Office Action, U.S. Appl. No. 08/071,218, Dec. 7, 1994.
US, Office Action, U.S. Appl. No. 08/071,218, Apr. 20, 1995.
US, Notice of Allowance, U.S. Appl. No. 08/071,218, Aug. 7, 1995.
US, Office Action, U.S. Appl. No. 08/480,666, Feb. 9, 1996.
US, Notice of Allowance, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
JP, Office Action, 2004-199893, Jul. 5, 2005.
JP, Office Action, 2006-000840, Feb. 28, 2007.
US, Office Action, U.S. Appl. No. 08/363,228, Oct. 3, 1995.
US, Office Action, U.S. Appl. No. 08/363,228, Mar. 27, 1996.
US, Notice of Allowance, U.S. Appl. No. 08/363,228, Apr. 9, 1996.
US, Office Action, U.S. Appl. No. 10/772,565, Mar. 4, 2009.
PCT, Int'l. Search Report, PCT/US2004/017666, Apr. 2, 2005.
EP, Communication, App. No. 04754296.4-1241, Apr. 4, 2007.
AU, First Report, App No. 2004251677, Sep. 26, 2008.
US, Office Action, U.S. Appl. No. 11/123,327, Dec. 11, 2008.
US, Office Action, U.S. Appl. No. 11/123,327, Oct. 14, 2009.
PCT, Int'l Search Report, PCT/US2005/016513, Aug. 9, 2005.
PCT, Int'l Preliminary Report, PCT/US2005/016513, Nov. 16, 2006.
EP, Communication, App. No. 05 749 692.9-1525, Jun. 15, 2007.
EP, Communication, App. No. 05 749 692.9-1525, Oct. 22, 2008.
US, Office Action, U.S. Appl. No. 11/154,749, Aug. 18, 2008.
US, Office Action, U.S. Appl. No. 11/154,749, Jan. 23, 2009.
PCT, Int'l Search Report, PCT/US2005/021518, Jan. 3, 2006.
PCT, Int'l Preliminary Report, PCT/US2005/021518, Jan. 4, 2007.
EP, Communication, App. No. 05 762 201.1-2202, May 18, 2007.
EP, Communication, App. No. 05 762 201.1-2202, Jul. 18, 2008.
US, Office Action, U.S. Appl. No. 11/269,378, Aug. 20, 2008.
US, Office Action, U.S. Appl. No. 11/269,378, Apr. 28, 2009.
PCT, Int'l Search Report, PCT/US2005/040380, Mar. 15, 2006.
PCT, Int'l Preliminary Report, PCT/US2005/040380, May 18, 2007.
US, Office Action, U.S. Appl. No. 11/277,896, Apr. 14, 2009.
PCT, Int'l Search Report, PCT/US2006/012067, Aug. 9, 2006.
PCT, Int'l Preliminary Report, PCT/US2006/012067, Oct. 11, 2007.
EP, Communication, App. No. 06 740 274.3-2416, Jan. 31, 2008.
EP, Communication, App. No. 06 740 274.3-2416, Sep. 17, 2008.
EP, Notice of Intention to Grant, App. No. 06 740 274.3-2416, Mar. 20, 2009.
US, Office Action, U.S. Appl. No. 11/379,360, Apr. 3, 2009.
PCT, Int'l Search Report, PCT/US2006/014852, Dec. 4, 2006.
PCT, Int'l Preliminary Report, PCT/US2006/014852, Nov. 1, 2007.
PCT, Int'l Search Report, PCT/US2007/074367, Dec. 17, 2007.
PCT, Int'l Preliminary Report, PCT/US2007/074367, Feb. 5, 2009.
EP, Communication, App. No. 07 813 357.6-1523, Sep. 29, 2009.
PCT, Int'l Search Report, PCT/US2007/075448, Jul. 4, 2008.
PCT, Int'l Search Report, PCT/US2008/076281, Jan. 13, 2009.
PCT, Int'l Search Report, PCT/US2008/076285, Dec. 30, 2008.
PCT, Int'l Search Report, PCT/US2008/076290, Jan. 30, 2009.
PCT, Int'l Search Report, PCT/US2008/078838, Jan. 16, 2009.
Ibenthal, A. et al: Multimedia Im Fahrzeug: Dienste Und Technik, Mar. 2000, Fernseh Und Kinotechnik, Vde Verlad GMBH. Berlin, DE, pp. 100-105, XP000966339 ISSN: 0015-014.
Chen, Y. et al., Personalized Multimedia Services Using a Mobile Service Platform, 2002 IEEE, 0-7803-7376-6/02, Mar. 17, 2002, pp. 918-925.
Gratschew, S., et al., A Multimedia Messaging Platform for Content Delivering, 2003 IEEE, 0-7803-7661-7/03, Feb. 23, 2003, pp. 431-435.
CN, Office Action, Chinese Application No. 200780029616.X, Nov. 2, 2012.
EP, Office Action, EP Application No. 08 830 787.1, Dec. 9, 2011.
JP, Office Action, Japanese Application No. 2009-523977, Jul. 17, 2012.
KR, Office Action, Korean Application No. 10-2006-7026708, Sep. 16, 2011.

\* cited by examiner

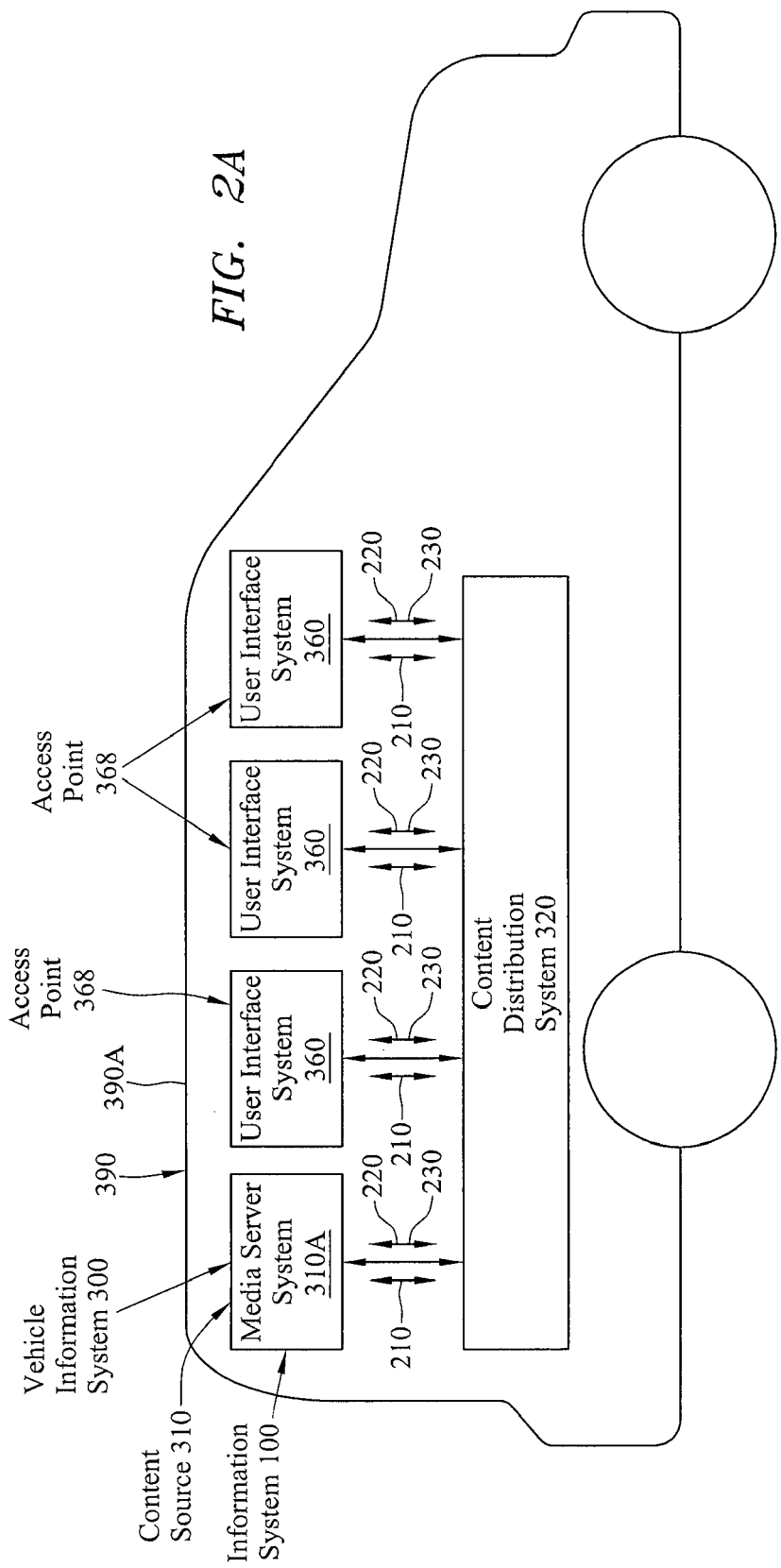

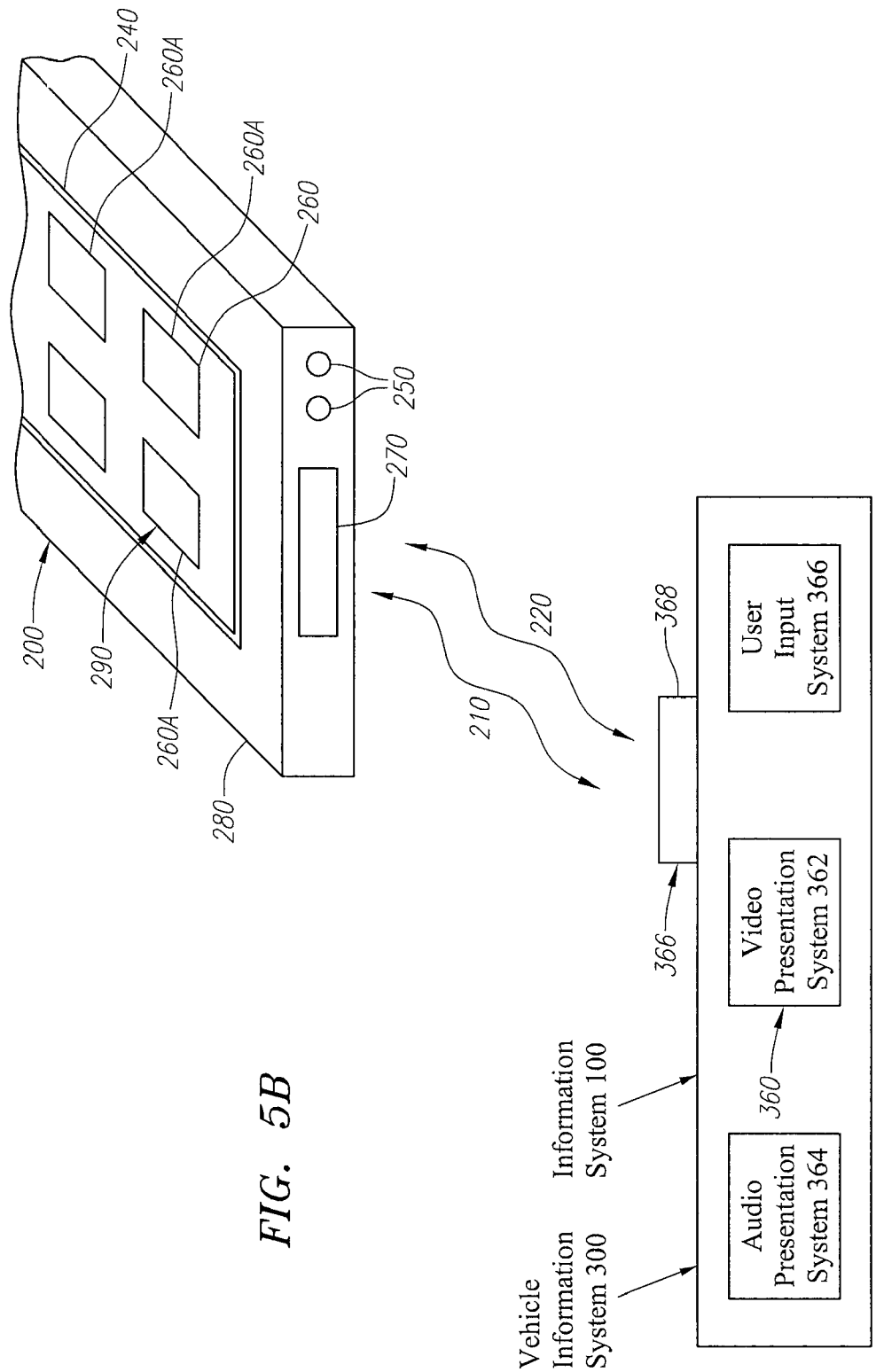

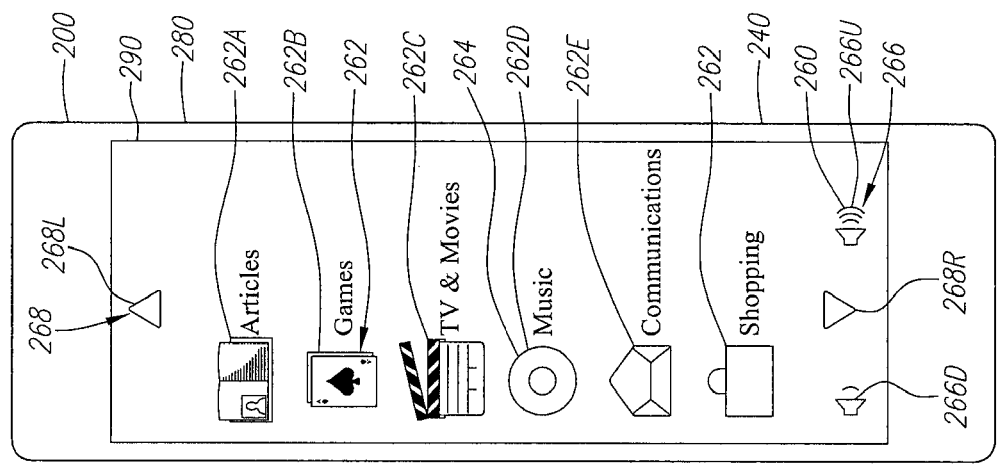
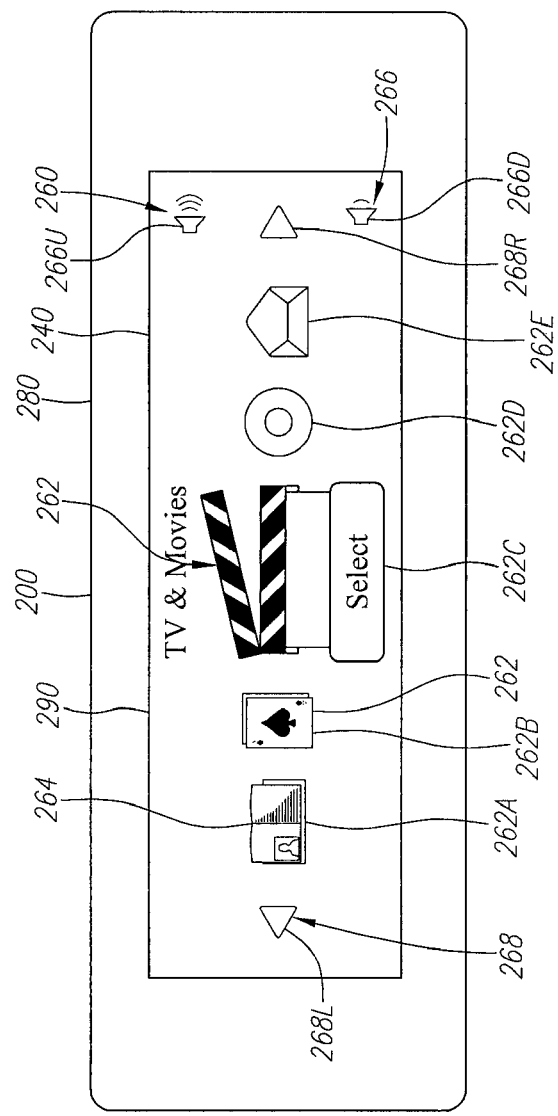
FIG. 7A
FIG. 7B

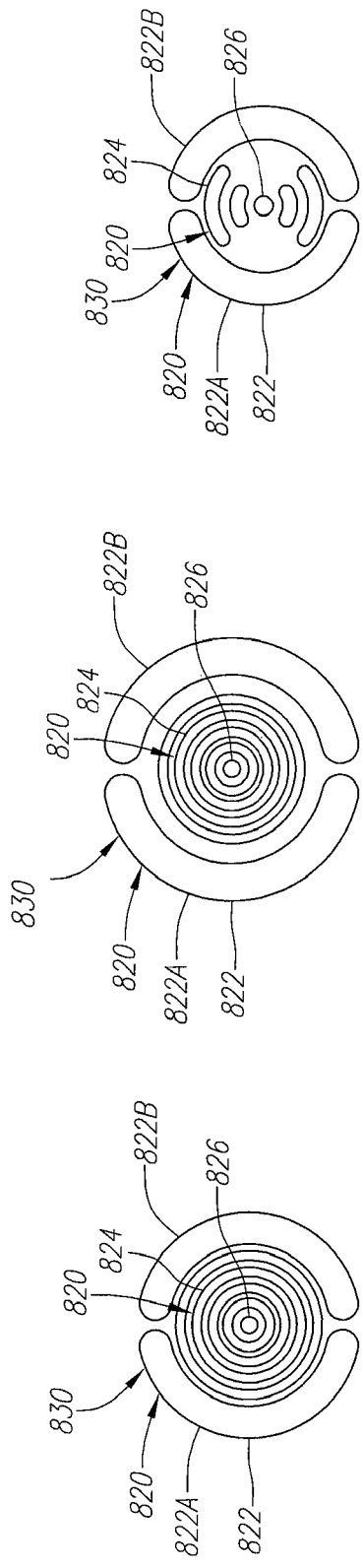
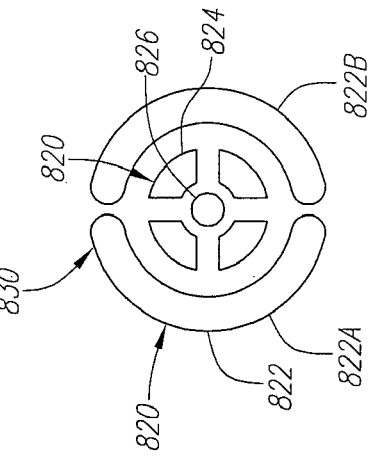
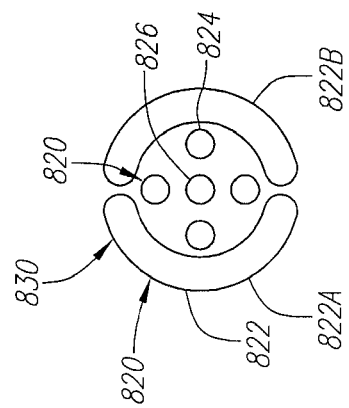
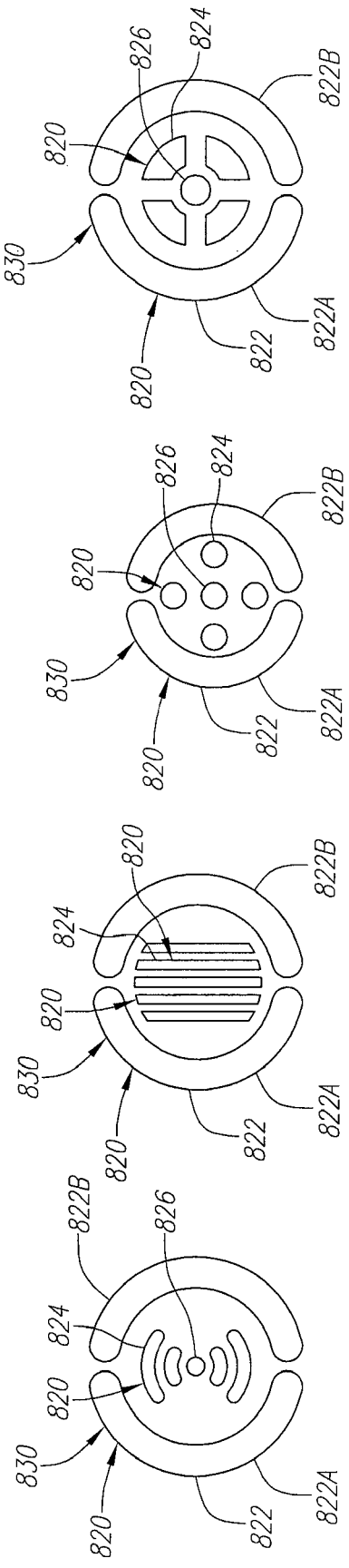
FIG. 11A  FIG. 11B  FIG. 11C  FIG. 11D  FIG. 11E  FIG. 11F  FIG. 11G

SYSTEM AND METHOD FOR HOSTING MULTIPLAYER GAMES

CROSS-REFERENCE TO RELATED APPLICATIONS

This application is a continuation-in-part application of application Ser. No. 12/210,689, filed on Sep. 15, 2008, now U.S. Pat. No. 8,547,340, which claims the benefit of U.S. provisional patent application Ser. No. 61/278,167, filed on Oct. 2, 2009. Priority to each of the prior applications is expressly claimed, and the disclosures of the applications are hereby incorporated herein by reference in their entireties.

CROSS-REFERENCE TO RELATED NONPROVISIONAL APPLICATIONS

The following United States nonprovisional patent applications are fully owned by the assignee of the present application and are filed on the same date herewith. The disclosure of the nonprovisional patent applications are hereby incorporated herein by reference in their entireties and for all purposes:

"SYSTEM AND METHOD FOR INTERFACING A PORTABLE MEDIA DEVICE WITH A VEHICLE INFORMATION SYSTEM," Ser. No. 12/210,624, filed Sep. 15, 2008;

"MEDIA DEVICE INTERFACE SYSTEM AND METHOD FOR VEHICLE INFORMATION SYSTEMS," Ser. No. 12/210,636, filed Sep. 15, 2008; and "MEDIA DEVICE INTERFACE SYSTEM AND METHOD FOR VEHICLE INFORMATION SYSTEMS," Ser. No. 12/210,652, filed Sep. 15, 2008.

FIELD

The present disclosure relates generally to gaming systems and more particularly, but not exclusively, to multiplayer gaming system for enabling passengers traveling aboard a passenger vehicle to participate in a multiplayer game.

BACKGROUND

Passenger vehicles, such as automobiles and aircraft, often include vehicle information systems for satisfying passenger demand for access to viewing content, such as entertainment, information content, or other viewing content, while traveling.

Conventional vehicle information (or entertainment) systems typically include overhead cabin video systems or seat-based video systems with individual controls such that viewing content is selectable by the passengers. The viewing content can include audio and video content that is derived from a variety of content sources. Prerecorded viewing content, such as motion pictures and music, can be provided by internal content sources, such as audio and video players, that are installed aboard the vehicle. The conventional vehicle information systems likewise can include an antenna system for receiving viewing content, such as live television programming and/or Internet content, transmitted from one or more content providers (or sources) that are external to, and/or remote from, the vehicle.

Such conventional vehicle information systems, however, suffer from numerous disadvantages. Selection of the viewing content, for example, can prove difficult due to the awkward placement and operation of the user controls. Similarly, the video systems of the vehicle information systems typically are located distally from the passenger controls, such as overhead and/or on an opposing seatback. Some passengers, for example, wish to play games during travel but find the vehicle information systems to be complicated to operate and the games difficult to enjoy.

In addition, when participating in multiplayer games with other passengers traveling aboard the passenger vehicle, conventional vehicle information systems typically present the game elements via the seatback (or overhead) video systems; however, the participating passengers want to be able to conceal hidden game elements from the other participating passengers during play. If participating in a card game, for instance, each participating passenger does not want any other participating passengers to be able to view his cards. Such system shortcomings are a frequent source of passenger complaints during travel.

In view of the foregoing, a need exists for an improved multiplayer gaming system and method that provides versatile and intuitive user controls in an effort to overcome the aforementioned obstacles and deficiencies of conventional vehicle information systems.

BRIEF DESCRIPTION OF THE DRAWINGS

FIG. 2A is an exemplary top-level drawing illustrating the information system of FIG. 1, wherein the information system comprises a vehicle information system installed aboard an automobile.

FIG. 5B is an exemplary top-level drawing illustrating an embodiment of the portable control device of FIG. 5A, wherein the portable control device is in communication with the vehicle information system via a wireless communication connection.

FIG. 7A is an exemplary detail drawing illustrating an alternative embodiment of the menu system of FIG. 6A.

FIG. 7B is an exemplary detail drawing illustrating an alternative embodiment of the menu system of FIG. 7A, wherein the menu system is provided as a vertical menu system.

FIG. 11A is an exemplary detail drawing illustrating an embodiment of a system contact arrangement of the break-away communication connector system of FIGS. 10B-C, wherein the system contacts are provided in a concentric (or bull's eye) contact arrangement.

FIG. 11B is an exemplary detail drawing illustrating an alternative embodiment of the contact arrangement of FIG. 11A, wherein a spacing between adjacent system contacts is not uniform.

FIG. 11C is an exemplary detail drawing illustrating another alternative embodiment of the contact arrangement of FIG. 11A, wherein the system contacts are provided as semi-circles.

FIG. 11D is an exemplary detail drawing illustrating an alternative embodiment of the contact arrangement of FIG. 11C, wherein a spacing between adjacent system contacts is not uniform.

FIG. 11E is an exemplary detail drawings illustrating another alternative embodiment of the contact arrangement of FIG. 11A, wherein the system contacts include an arrangement of straight system contacts.

FIG. 11F is an exemplary detail drawings illustrating another alternative embodiment of the contact arrangement of FIG. 11A, wherein the system contacts include an arrangement of round contacts.

FIG. 11G is an exemplary detail drawings illustrating another alternative embodiment of the contact arrangement of FIG. 11A, wherein the system contacts include an arrangement of pie-shaped contacts.

Figure 1:
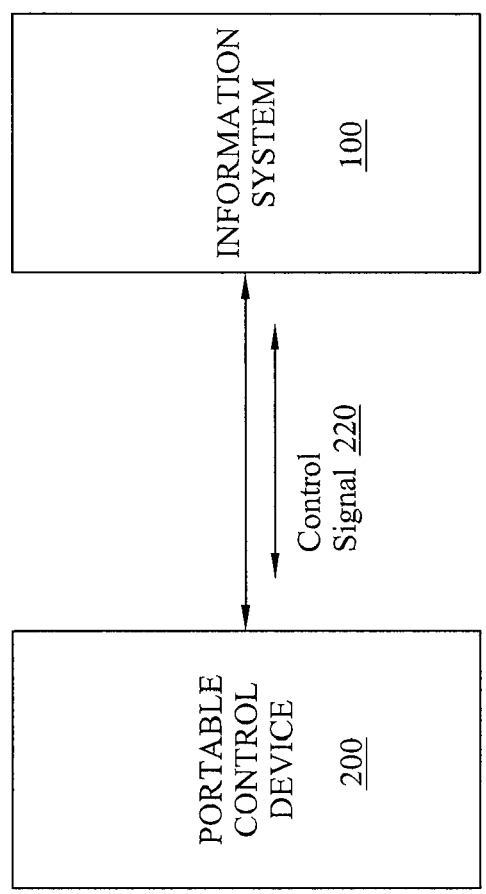
FIG. 1 is an exemplary top-level drawing illustrating an embodiment of a portable control device for interacting with an information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available vehicle information systems are complicated to operate and suffer from the awkward placement and operation of the user controls, an information system with a user interface that includes a portable control device can prove desirable and provide a basis for a wide range of system applications, such as vehicle information systems for use aboard automobiles, aircraft, and other types of vehicles during travel. This result can be achieved, according to one embodiment disclosed herein, by a personal (or portable) user control device 200 as illustrated in FIG. 1.

Turning to FIG. 1, the personal user control device 200 is shown as being configured for use with an information system 100. The personal user control device 200 can be provided as a single, handheld unit that advantageously integrates typical user control functions. When in communication with the information system 100, the personal user control device 200 can automatically detect system status information from the information system 100. The system status information can include, for example, system functionality available from the information system 100, viewing content 210 (shown in FIGS. 2A-B) available from the information system 100, and/or a current system operation mode of the information system 100. The personal user control device 200 likewise provides a user interface system 290 (shown in FIG. 4B) that instinctively adapts to the detected system status information from the information system 100. In other words, the user interface system 290 of personal user control device 200 preferably is fully customizable. The personal user control device 200 thereby provides a versatile and intuitive manner for interacting with the information system 100.

The personal user control device 200 supports a simple manner for permitting users (or passengers) to interact with the information system 100 using the user-friendly interface system 290. Unlike conventional control devices that provide fixed user controls with dedicated control buttons, the user interface system 290 includes no (or a limited number of) dedicated buttons and enables the personal user control device 200 to provide a customizable environment for interacting with the information system 100. As illustrated in FIG. 1, the personal user control device 200 can receive a control signal 220 identifying the current operation mode of the information system 100 and can adapt the appearance and/or operation of the user interface system 290 in accordance with the current operation mode of the information system 100. The personal user control device 200 likewise can select desired system functionality, viewing content 210, and/or system operation mode of the information system 100 via a control signal 220. In other words, the personal user control device 200 can exchange control signals (or commands) 220, such as user control signals (or user control instructions) 230 (shown in FIGS. 4A-B), with, and/or receive operating power 220P (shown in FIG. 4B) from, the information system 100.

When in communication with the information system 100, the personal user control device 200 can be used in conjunction with a video presentation system 362 (shown in FIGS. 4A-B) and/or an audio presentation system 364 (shown in FIGS. 4A-B) of the information system 100. The user interface system 290 of the personal user control device 200 likewise can include an integrated video display system 240 (shown in FIG. 4B) and/or audio system 250 (shown in FIG. 4B). System functionality, viewing content 210, and/or system operation mode of the information system 100 thereby can be selected via the personal user control device 200. The personal user control device 200 preferably becomes a seamless part of the information system 100.

As desired, the personal user control device 200 can be provided as a handheld device, such as a personal media device, a laptop computer, a palmtop computer, a personal digital assistant (PDA), cellular telephone, and/or a MPEG Audio Layer 3 (MP3) device. Illustrative personal media devices are shown and described in the co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties.

The viewing content 210 can comprise any conventional type of audio and/or video viewing content, such as stored (or time-delayed) viewing content and/or live (or real-time) viewing content, in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include text messaging, electronic mail (or email), television programming content, music content, podcast content, photograph album content, audiobook content, movie content, and/or game content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or additionally, to entertainment content, such as live satellite television programming and/or live satellite radio programming, the viewing content likewise can include two-way communications, such as real-time access to the Internet 310C (shown in FIG. 2B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content as shown and described herein are not exhaustive and are provided herein for purposes of illustration only and not for purposes of limitation.

Figure 2B:
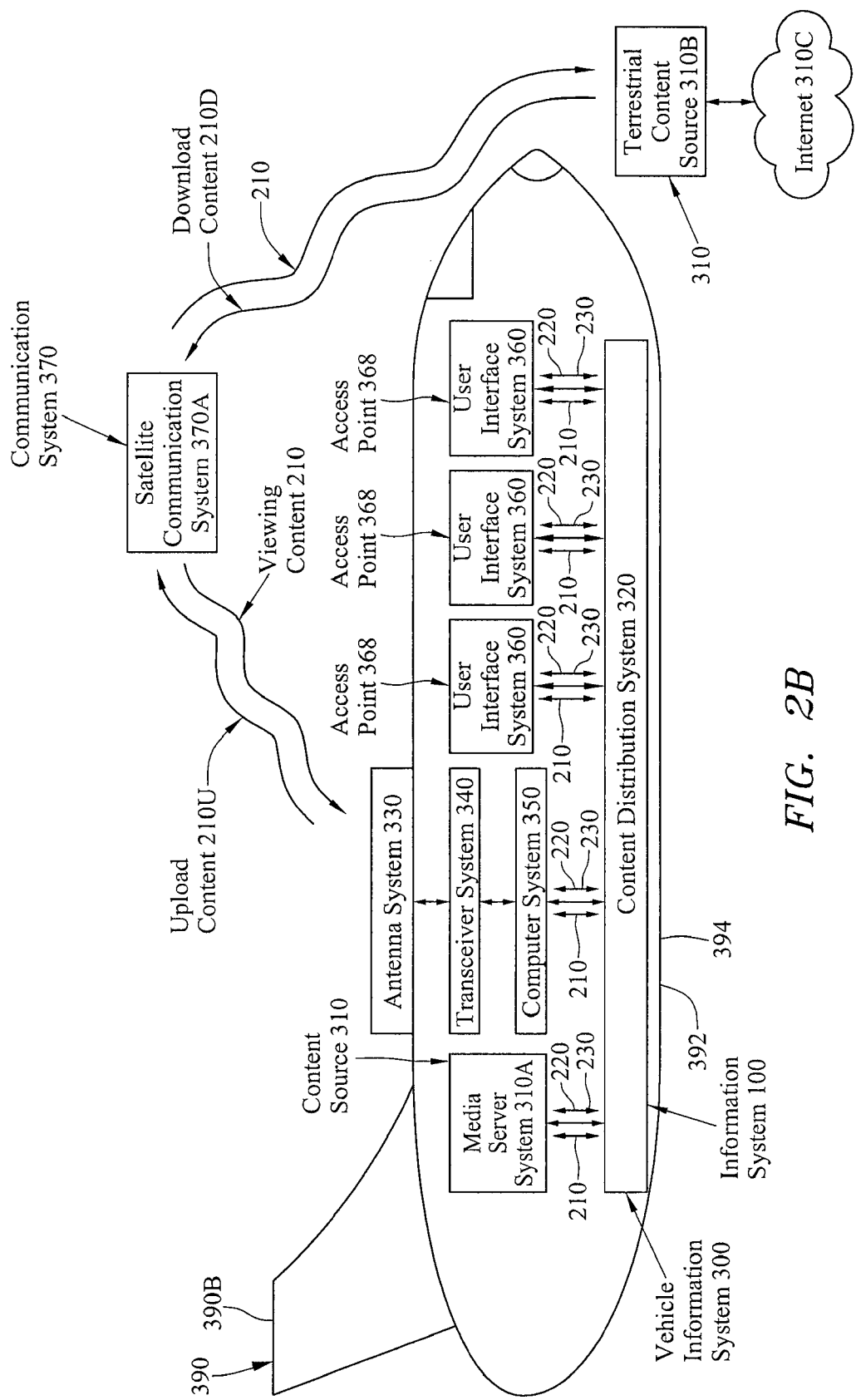
FIG. 2B is an exemplary top-level drawing illustrating the vehicle information system of FIG. 2A, wherein the vehicle information system is installed aboard an aircraft.

Although the information system 100 can be disposed in a fixed location, such as a building, the information system 100 likewise can advantageously be applied in portable system applications. Turning to FIGS. 2A-B, the information system 100 is shown as comprising a vehicle information system 300 that can be configured for installation aboard a wide variety of vehicles 390. Exemplary types of vehicles can include an automobile 390A (shown in FIG. 2A), an aircraft 390B (shown in FIG. 2B), a bus, a recreational vehicle, a boat, and/or a locomotive, or any other type of passenger vehicle without limitation. If installed on an aircraft 390B as illustrated in FIG. 2B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 2A-B, the vehicle information system 300 comprises at least one conventional content source 310 and one or more user (or passenger) interface systems 360 that communicate via a real-time content distribution system 320. Each content source 310 can be provided in the manner set forth in the co-pending U.S. patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," Ser. No. 12/210,624, filed on Sep. 15, 2008; entitled "PORTABLE USER CONTROL DEVICE AND METHOD FOR VEHICLE INFORMATION SYSTEMS," Ser. No. 12/210,689, filed on Sep. 15, 2008; entitled "SYSTEM AND METHOD FOR RECEIVING BROADCAST CONTENT ON A MOBILE PLATFORM DURING TRAVEL," Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," Ser. No. 12/245,521, filed on Oct. 3, 2008, which are assigned to the assignee of the present application and the respective disclosures of which are hereby incorporated herein by reference in their entireties.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 2A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 2B as providing access to the Internet 310C. Although shown and described as comprising the satellite communication system 370A for purposes of illustration, it is understood that the communication system 370 can comprise any conventional type of wireless communication system, such as a cellular communication system (not shown) and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 2A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interfaces 360, as desired. Although shown and described as being separate systems for purposes of illustration, the computer system 350 and the media server system 310A can be at least partially integrated.

Figure 3:
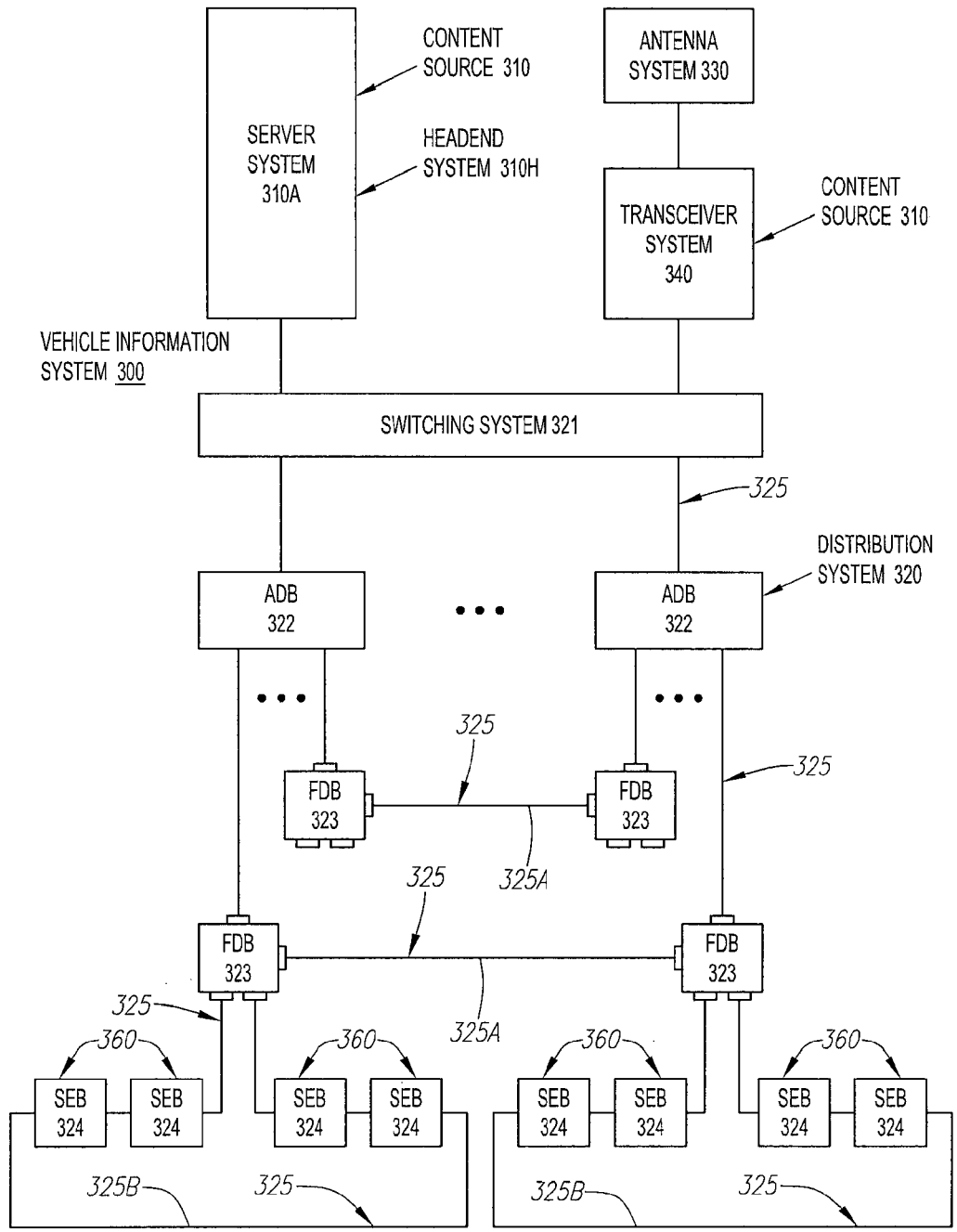
FIG. 3 is an exemplary detail drawing illustrating one preferred embodiment of a distribution system for the vehicle information systems of FIGS. 2A-B.

The vehicle information system elements, including the content sources 310 and the user interface systems 360, are shown in FIGS. 2A-B as communicating via the content distribution system 320. FIG. 3 illustrates an exemplary content distribution system 320 for the vehicle information system 300. The content distribution system 320 of FIG. 3 couples, and supports communication between a headend system 310H, which includes the content sources 310, and the plurality of user interface systems 360. The distribution system 320 as shown in FIG. 3 is provided in the manner set forth co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties. Alternatively, and/or additionally, the distribution system 320 can be provided in the manner set forth in the co-pending U.S. patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety.

As desired, the distribution system 320 likewise can include a network management system (not shown) provided in the manner set forth in co-pending U.S. patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 3, the distribution system 320 can be provided as a plurality of area distribution boxes (ADBs) 322, a plurality of floor disconnect boxes (FDBs) 323, and a plurality of seat electronics boxes (SEBs) (and/or premium seat electronics boxes (PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 3. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

As desired, the floor disconnect boxes 323 advantageously can be provided as routing systems and/or interconnected in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 3. Each SEB loopback connection 325B therefore forms a loopback path among the daisy-chained seat electronics boxes 324 coupled with the relevant floor disconnect box 323.

Returning to FIGS. 2A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending U.S. patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety.

Figure 4A:
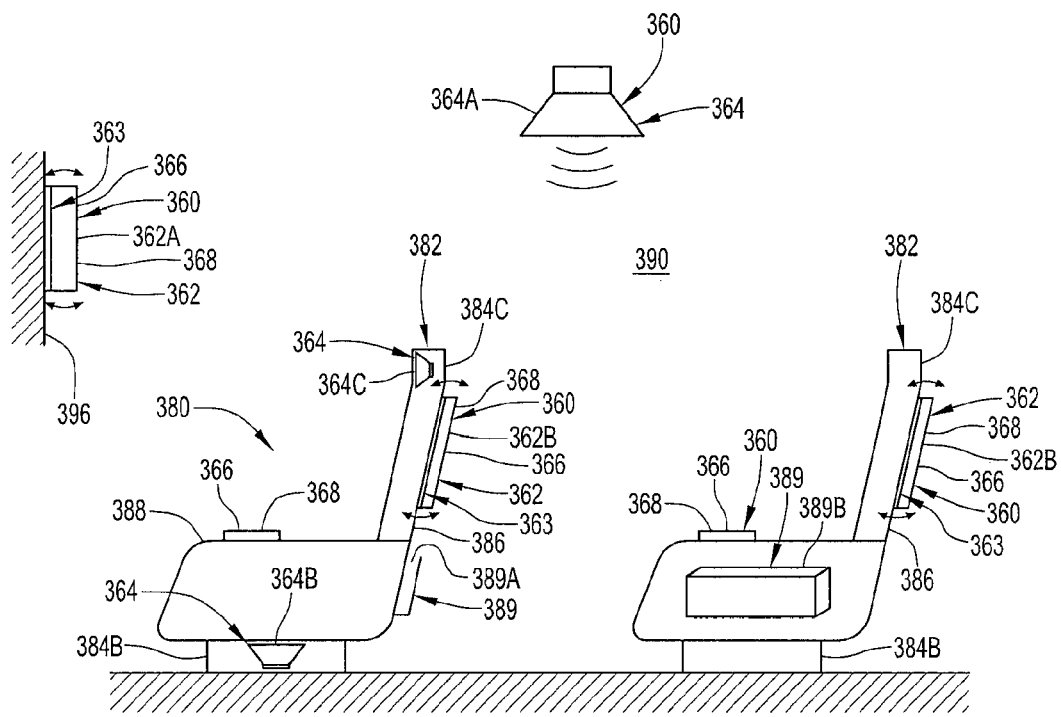
FIG. 4A is an exemplary top-level drawing illustrating a passenger cabin of a vehicle, wherein the vehicle information system of FIGS. 2A-B has been installed.

FIG. 4A provides a view of a passenger cabin 380 of a passenger vehicle 390, such as the automobile 390A (shown in FIG. 2A) and/or the aircraft 390B (shown in FIG. 2B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the passenger seat 382. A speaker system likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending U.S. patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 4A, the user interface system 360 likewise can include an input system 366 for permitting the user (or passenger) to communicate with the vehicle information system 300, such as via an exchange of control signals 220. For example, the input system 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal user control device 200 (shown in FIG. 4B) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 4B:
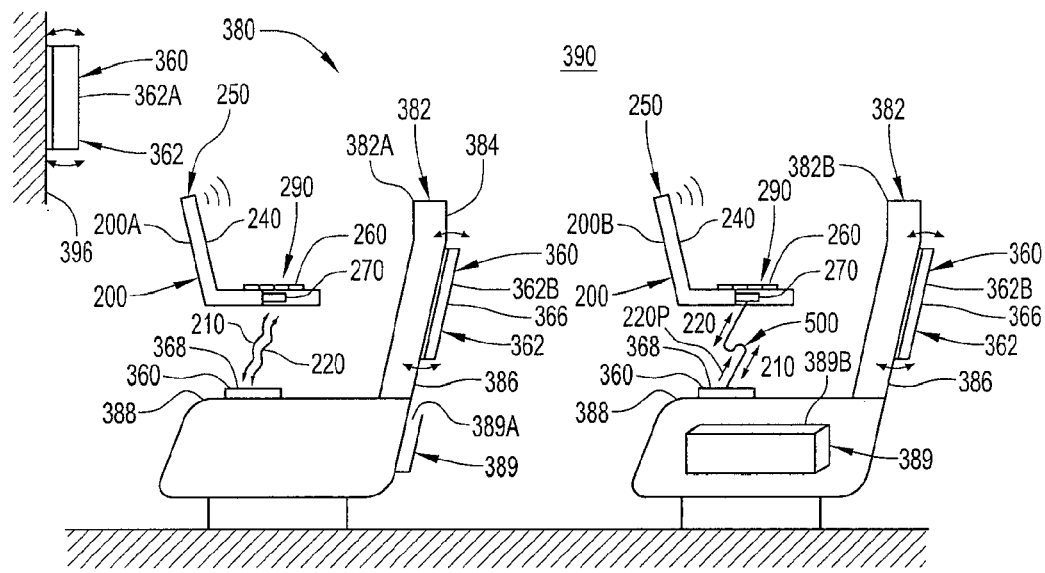
FIG. 4B is an exemplary top-level drawing illustrating an embodiment of the vehicle information system of FIG. 4A, wherein the vehicle information system is in communication with the portable control device of FIG. 1.

Turning to FIG. 4B, the personal user control devices 200 and the vehicle information system 300 are shown as communicating via respective access points 368. Being provided in the manner set forth above with reference to FIG. 1, the illustrated personal user control devices 200 each include a user interface system 290. The user interface systems 290 can comprise a video display system 240 for visually presenting the viewing content 210 and/or an audio system 250 for audibly presenting the viewing content 210. Each user interface system 290 likewise can include a user control system 260, which can be provided in any conventional manner and typically includes one or more switches (or pushbuttons), such as a keyboard or a keypad, and/or a pointing device, such as a mouse, trackball, or stylus. The personal user control devices 200 thereby can select desired viewing content 210 and control the manner in which the selected viewing content 210 is received and/or presented.

The personal user control devices 200 likewise include a communication port (or connector) 270. The communication port 270 enables the personal user control devices 200 to communicate with the vehicle information system 300 via the access points 368 of the user interface systems 360. As illustrated with personal user control device 200A, the communication port 270 and the access points 368 can supported wireless communications; whereas, support for wired communications between the communication port 270 and the access points 368 via a communication cable assembly 500 is shown with personal user control device 200B. When the communication port 270 and the access points 368 are in communication, the vehicle information system 300 supports a simple manner for permitting the associated personal user control device 200 to be integrated with the vehicle information system 300 using a user-friendly communication interface.

When the personal user control device 200 and the vehicle information system 300 are in communication, the vehicle information system 300 can perform a plurality of integration tasks simultaneously, enabling the personal user control device 200 to become fully integrated with the vehicle information system 300 via a selected access point 368. The system elements of the vehicle information system 300 and the personal user control device 200 thereby become interchangeable. The personal user control device 200 likewise can receive control signals (or commands) 220 and/or operating power 220P from the vehicle information system 300. Thereby, the personal user control device 200 advantageously can become a seamless part of the vehicle information system 300.

For example, user instructions 230 (shown in FIGS. 2A-B) for controlling the operation of the vehicle information system 300 can be provided via the input system 366 of the vehicle information system 300 and/or the user control system 260 of the personal user control device 200. In other words, the input system 366 of the vehicle information system 300 and/or the user control system 260 of the personal user control device 200 can be used to select viewing content 210 and control the manner in which the selected viewing content 210 is received and/or presented. The selected viewing content 210 can be provided by a relevant content source 310 (shown in FIGS. 2A-B) of the vehicle information system 300 and/or by storage media (not shown) disposed within the personal user control device 200. A video portion of the selected viewing content 210 thereby can be presented via the video presentation system 362 of the vehicle information system 300 and/or the video display system 240 of the personal user control device 200. The audio presentation system 364 of the vehicle information system 300 and/or the audio system 250 of the personal user control device 200 can be used to present an audio portion of the selected viewing content 210. If the video display system 240 of the personal user control device 200 is much smaller than the video presentation system 362 of the vehicle information system 300, a passenger (or user) may prefer to view the selected viewing content 210 via the larger video presentation system 362.

When no longer in use and/or direct physical contact with the personal user control device 200 is not otherwise required, the personal user control device 200 can be stored at the passenger seat 382. For example, the passenger seat 382 can include a storage compartment 389 for providing storage of the personal user control device 200. The storage compartment 389 can be provided in any conventional manner and at any suitable portion of the passenger seat 382. As illustrated with passenger seat 382B, the personal user control device 200 can be placed in a storage pocket 389B formed in the armrest 388 of the passenger seat 382B. The storage compartment 389 likewise can be provided on the seatback 386 and/or the headrest 384 of the passenger seat 382. Storage compartment 389A of passenger seat 382A, for example, is shown as being formed on the lower seatback 386 of the passenger seat 382A. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

Figure 5A:
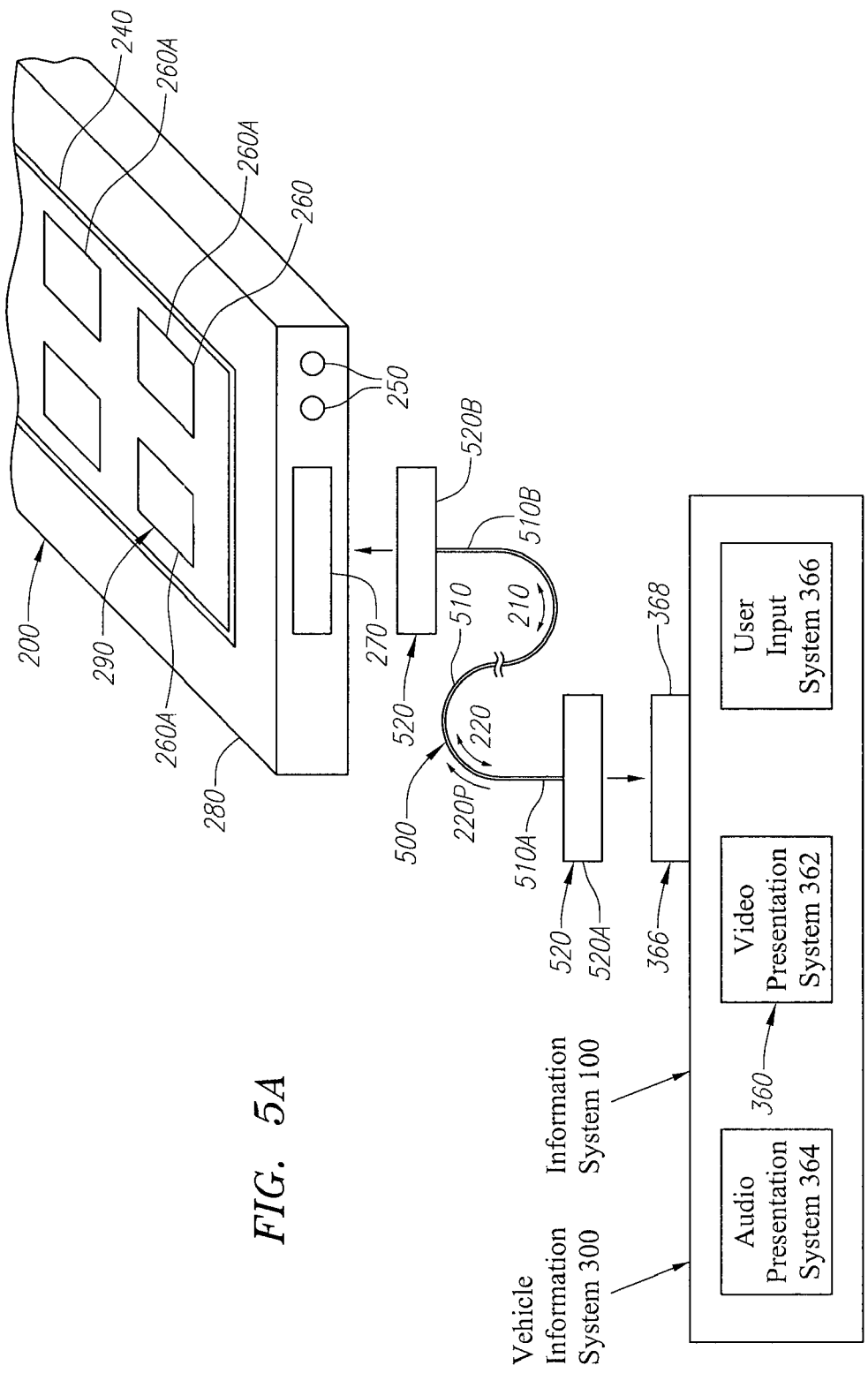
FIG. 5A is an exemplary top-level drawing illustrating an embodiment of the portable control device of FIG. 1, wherein the portable control device is in communication with the vehicle information system of FIGS. 2A-B via a wired communication connection.

As set forth above, the personal user control device 200 can support wired and/or wireless communications with the vehicle information system 300. FIG. 5A illustrates the personal user control device 200 communicating with the vehicle information system 300 via an exemplary communication cable assembly 500. The communication cable assembly 500 can comprise a conventional communication assembly, such as a Universal Serial Bus (USB) cable assembly, having a communication cable 510 with a suitable cable length and being terminated with two or more communication connectors (or ports) 520. As shown in FIG. 5A, the communication cable 510 is terminated with a system communication connector (or port) 520A for removably coupling with the vehicle information system 300 and a device communication connector (or port) 520B for removably coupling with the personal user control device 200. The system communication connector 520A and the device communication connector 520B each can comprise any conventional type of connector system. Although shown and described as being provided on respective opposite end regions 510A, 510B of the communication cable assembly 500 for purposes of illustration only, the system and device communication connectors 520A, 520B can be provided the communication cable assembly 500 in any conventional manner.

The communication cable assembly 500 can be utilized to transmit a variety of diverse signal types, such as audio signals, video signals, data signals, control signals 220, and operating power 220P signals. The communication cable 510 preferably is provided in a manner to minimize interference (or crosstalk) among these diverse signals in the manner set forth in more detail in the above-referenced related nonprovisional patent application, "SYSTEM AND METHOD FOR INTERFACING A PORTABLE MEDIA DEVICE WITH A VEHICLE INFORMATION SYSTEM," Ser. No. 12/210,624, filed Sep. 15, 2008. The access point 368 of the vehicle information system 300 can be provided as a communication connector (or port) that is configured to cooperate with the system communication connector 520A. The access point 368 thereby can receive, and couple with, the system communication connector 520A. As desired, the system communication connector 520A likewise can be removed (or disconnected) from the access point 368.

The device communication connector 520B of the communication cable assembly 500 likewise can be received by, and removably couple with, the communication connector 270 of the personal user control device 200. In other words, the device communication connector 520B of the communication cable assembly 500 can cooperate with the communication connector 270 of the personal user control device 200. The coupling between the system communication connector 520A and the access point 368 and/or the coupling between the device communication connector 520B and the communication connector 270 can be provided as a break-away communication connector system in the manner set forth in more detail in the above-referenced related nonprovisional patent application, "MEDIA DEVICE INTERFACE SYSTEM AND METHOD FOR VEHICLE INFORMATION SYSTEMS," Ser. No. 12/210,636, filed Sep. 15, 2008, and "MEDIA DEVICE INTERFACE SYSTEM AND METHOD FOR VEHICLE INFORMATION SYSTEMS," Ser. No. 12/210,652, filed Sep. 15, 2008.

The personal user control device 200 is shown as including a user interface system 290 that is disposed on (and/or within) a handheld case (or housing) 280. The user interface system 290 can include a user control system 260, a video display system 240, and/or an audio system 250 each being provided in the manner set forth in more detail above with reference to FIG. 4B. Preferably including no (or a limited number of) dedicated buttons, the video display system 240 and the user control system 260 of the user interface system 290 can be provided as a touchscreen display system for interfacing with the vehicle information system 300. If provided as the touchscreen display system, the video display system 240 can present a plurality of user-selectable icons 260A that are associated with selected system features, viewing content 210, and/or system operation mode associated with the vehicle information system 300. The user interface system 290 thereby provides a simplified user interaction layout. As desired, the viewing content 210 can be presented via the video display system 240 and/or the audio system 250 of the personal user control device 200 and/or the video presentation system 362 (shown in FIGS. 4A-B) and/or the audio presentation system 364 (shown in FIGS. 4A-B) of the vehicle information system 300 (shown in FIGS. 2A-B). The viewing content 210 preferably can be viewed with special effects, such as three-dimensional (3D) viewing capabilities.

The audio system 250 of the personal user control device 200 can comprise any conventional type of audio presentation system and, as desired, can be provided as an internal speaker system (not shown) that is disposed on (and/or within) a handheld case (or housing) 280. As shown in FIG. 5A, for example, the audio system 250 of the personal user control device 200 can include at least one audio connector system for coupling the personal user control device 200 with a peripheral audio presentation system (not shown). Exemplary peripheral audio presentation systems can include headphones, speakers, and/or amplifiers. In a preferred embodiment, the audio system 250 can provide operating power to the peripheral audio presentation system. Thereby, powered peripheral audio presentation devices, such as noise canceling headphones, can receive the operating power via the audio system 250.

When coupled via the communication cable assembly 500, the personal user control device 200 and the vehicle information system 300 can initiate, and maintain, communications. The viewing content 210, including any onboard service and local viewing content, thereby can be selected by the user control system 260 of the personal user control device 200 for presentation on the video presentation system 362 (shown in FIGS. 4A-B) and/or the audio presentation system 364 (shown in FIGS. 4A-B) of the vehicle information system 300. Alternatively, and/or additionally, the video display system 240 and/or the audio system 250 of the personal user control device 200 can be adapted to present the selected viewing content 210. Since the personal user control device 200 can be advantageously configured to multitask, a first selection of viewing content 210, such as a motion picture can be presented via the video presentation system 362 and the audio presentation system 364 of the vehicle information system 300; while, the video display system 240 and/or the audio system 250 of the personal user control device 200 can present a second selection of viewing content 210, such as viewing content 210 provided by the Internet 310C (shown in FIG. 2B).

The personal user control device 200 and the vehicle information system 300 preferably communicate via a wireless communication system. As illustrated in FIG. 5B, the access point 368 of the vehicle information system 300 is shown as comprising a wireless access point; whereas, the communication port 270 of the personal user control device 200 is provided as a wireless communication port. When disposed within a predetermined range (or proximity) of the wireless access point 368, the personal user control device 200 can communicate with the vehicle information system 300 via the wireless access point 368. The personal user control device 200 thereby can automatically detect that it is in a "home" mode and/or can automatically detect a range and/or type of any compatible devices. Viewing content 210 and/or control signals (or commands) 220 can be exchanged between the wireless access point 368 of the vehicle information system 300 and the wireless communication port 270 of the personal user control device 200. The vehicle information system 300 can support any conventional wireless communication protocol with the personal user control device 200. Exemplary wireless protocols include a wireless fidelity (Wi-Fi) protocol in accordance with Institute of Electrical and Electronics Engineers (IEEE) Standard 802.11 and/or wireless metropolitan-area network (MAN) protocol, which also are known as a WiMax Wireless Broadband protocol, in accordance with IEEE Standard 802.16.

Figure 6A:
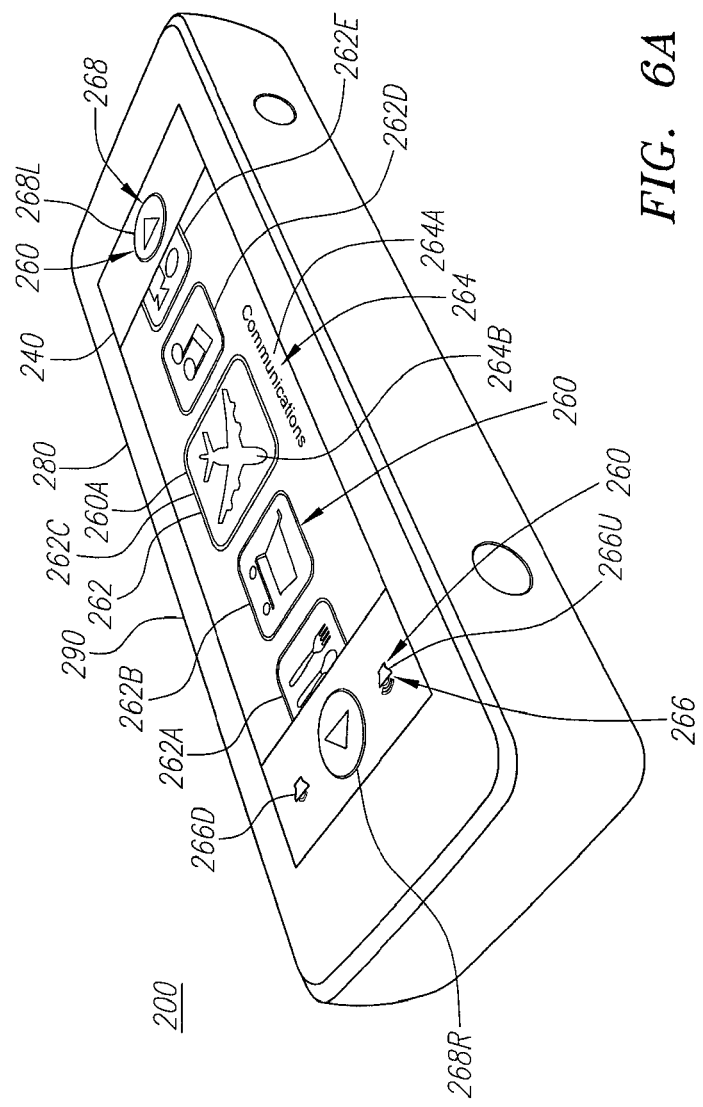
FIG. 6A is an exemplary detail drawing illustrating an embodiment of the portable control device of FIG. 1, wherein the portable control device presents a menu system that includes a plurality of user-selectable icons and is disposed within a handheld housing.

Turning to FIG. 6A, the user interface system 290 of the personal user control device 200 is shown with the video display system 240 and the user control system 260 being provided as a touchscreen display system to provide a rich user experience. The touchscreen display system, for example, can employ projected capacitive touchscreen technology. Being providing with a smooth, dead front display area, the touchscreen display system eliminates any ridges (or gaps) in the display area and thereby can be fairly spill-proof and easy to clean. Exemplary capacitive touchscreen display systems are manufactured by Trident Ltd. of Surrey, United Kingdom, Elo TouchSystems Inc., of Menlo Park, Calif., and TouchKO Inc., of Cedar Park, Tex. If the color mask of the touchscreen display system is disposed between the touchscreen panel and the display, a surface capacitive touchscreen display system may be employed. Although shown and described as comprising capacitive touchscreen technology for purposes of illustration only, the touchscreen display system can be provided using other touchscreen technologies, such as resistive touchscreen technology and/or infrared (IR) touchscreen technology.

The touchscreen display system can present the plurality of user-selectable icons 260A in the manner set forth in more detail above with reference to FIGS. 5A-B. More specifically, the user interface system 290 is shown as presenting a main menu system 262 that includes basic control selections 262A-E and that is part of an hierarchical menu system. One preferred embodiment of the main menu system 262 is illustrated in FIG. 6A. The user interface system 290 preferably presents the main menu system 262 upon being powered (or turned) on or otherwise initialized, and each basic control selection 262A-E can be associated with subsequent tiers (or levels) of interactivity and/or control within the hierarchical menu system. Exemplary basic control selections 262A-E can include a dining (or food service) control selection 262A, a shopping control selection 262B, a vehicle information system communication control selection 262C, a music control selection 262D, and/or a television (or movies) control selection 262E. As desired, one or more of the user-selectable icons 260A can be presented with special effects, such as a swirling icon.

Each of the basic control selections 262A-E can be associated with identifying indicia 264 that identifies the relevant control selection. As shown in FIG. 6A, the identifying indicia 264 can identify the basic control selections 262A-E in any conventional manner, including use of text 264A, such as words or abbreviations, and/or at least one symbol (or icon) 264B that identify the relevant control selection. The textual description 264A can be provided in one or more relevant languages and preferably is changeable such that a suitable language is presented based upon the geographical location of the vehicle information system 300. Each tier of interactivity and/or control within the hierarchical menu system likewise can be associated with identifying indicia 264, such as a textual description 264A as illustrated in FIG. 6A. Since the operation of the personal user control device 200 preferably is software programmable, each feature of the user interface system 290 can be customized as desired. For example, the identifying indicia 264, including the textual descriptions 264A and/or the symbols 264B, the colors, the basic control selections 262A-E, the main menu system 262, and/or even the hierarchical menu system can be readily changed to suit the tastes of the user or, as relevant, the branding of the vehicle operator.

Alternate preferred embodiments of the main menu system 262 that can be presented by the user interface system 290 are shown in FIGS. 7A-F. As illustrated in FIGS. 7A-F, each level of the menu system 262 can include any suitable arrangement and/or number of control selections 262A-E. The number of control selections 262A-E for a selected level of the menu system 262 typically is based upon the number of control options associated with the menu system level. The identifying indicia 264 for the control selections 262A-E likewise can be customized such that the identifying indicia 264 suit the tastes of the user or, as relevant, the branding of the vehicle operator. For example, the hierarchical menu system can include a setup menu level, which permits a user to select custom identifying indicia 264 and otherwise customize the presentation of one or more system levels of the hierarchical menu system. Although shown and described with reference to the main menu system 262 of the hierarchical menu system for purposes of illustration only, the discussion herein of the main menu system 262 can equally apply to any menu level within the hierarchical menu system.

Turning to FIG. 7A, for example, illustrative identifying indicia 264 for the control selections 262A-E are shown. The control selections 262A-E can be provided in any conventional manner and preferably identify the related system function of the vehicle information system 300 (shown in FIGS. 2A-B). As shown in FIG. 7A, the control selections 262A-E can be provided in a horizontal arrangement, being aligned with a longer dimension of the video display system 240 of the personal user control device 200. The control selections 262A-E likewise can be provided in a vertical arrangement as illustrated in FIG. 7B.

If provided with at least one accelerometer (not shown), for example, the personal user control device 200 can detect an orientation of the personal user control device 200 and portray the control selections 262A-E in either portrait mode or landscape mode, whichever is suitable. In other words, the at least one accelerometer can sense the orientation of the personal user control device 200 and adjust the presentation of the control selections 262A-E, or any other viewing content 210 (shown in FIGS. 2A-B), in accordance with the orientation of the personal user control device 200. The at least one accelerometer likewise can effect the manner in which the viewing content 210 is presented on the video presentation system 362 (shown in FIGS. 4A-B) and/or the audio presentation system 364 (shown in FIGS. 4A-B) of the vehicle information system 300. For example, as the personal user control device 200 is moved closer to (or further from) the video presentation system 362, the viewing content 210 as presented on the video presentation system 362 can become enlarged (or reduced). Similarly, the volume of the viewing content 210 as presented by the audio presentation system 364 can increase (or decrease) as the personal user control device 200 is moved closer to (or further from) the video presentation system 362 and/or the audio presentation system 364.

Figure 7C:
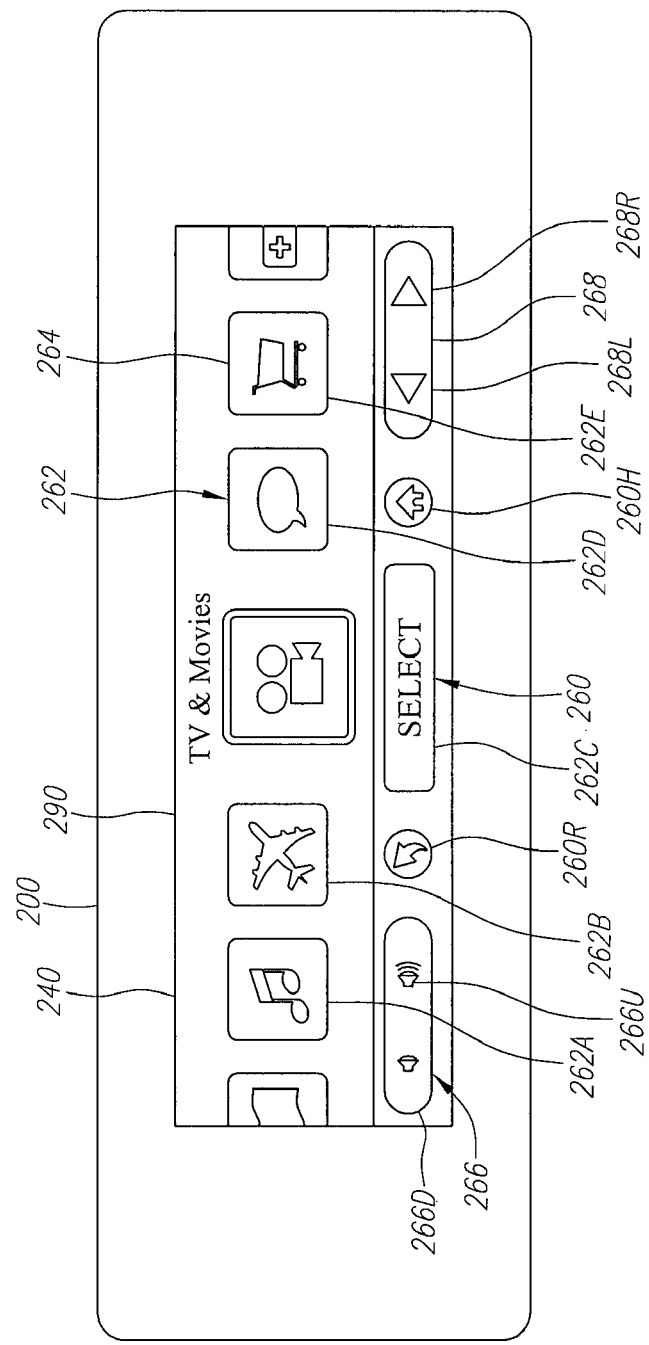
FIG. 7C is an exemplary detail drawing illustrating another alternative embodiment of the menu system of FIG. 6A, wherein the user control system is provided as a toolbar.
Figure 7D:
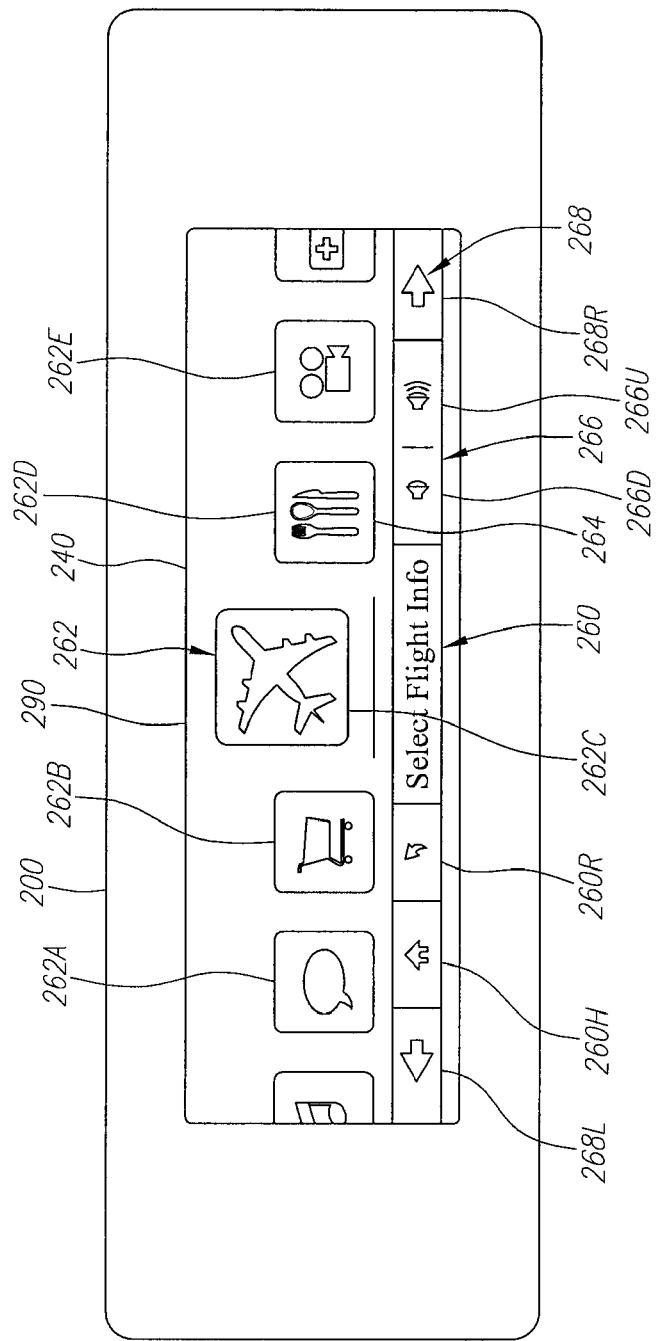
FIG. 7D is an exemplary detail drawing illustrating an alternative embodiment of the menu system of FIG. 7C.

FIG. 7C shows that the user control system 260 of the user interface system 290 can be provided (or arranged) as a control system toolbar. The control system toolbar can be presented in any conventional manner and can include any suitable control system functions. As illustrated in FIG. 7C, control system toolbar can be disposed adjacent to the control selections 262A-E of the main menu system 262. To facilitate navigation of the hierarchical menu system, the control system functions of the control system toolbar is shown as including a main menu control function 260H for directly returning to the main (or home) menu system 262 from any menu level within the hierarchical menu system. The control system functions of the control system toolbar likewise can include a previous level control function 260R for directly returning to a previously-viewed menu level (or a higher/lower menu level) within the hierarchical menu system. An alternative embodiment of the identifying indicia 264 for the control selections 262A-E and the control system toolbar of the user interface system 290 is illustrated in FIG. 7D.

Figure 7E:
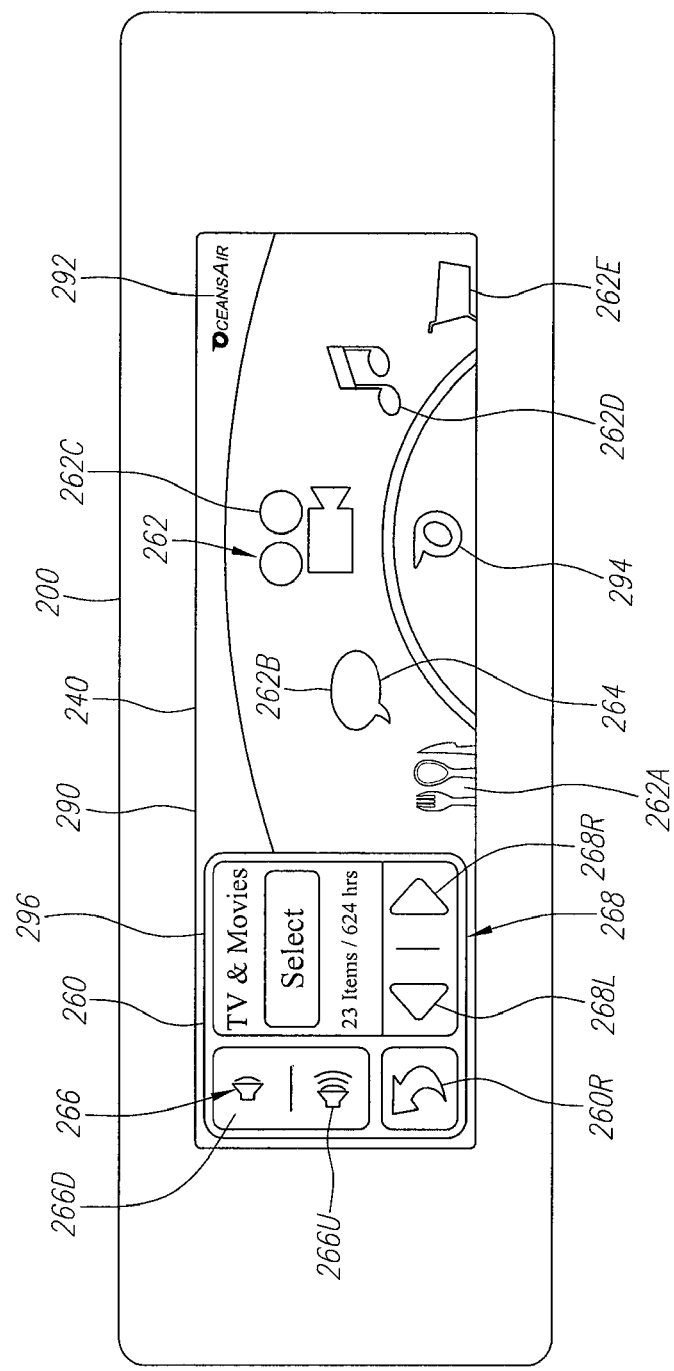
FIG. 7E is an exemplary detail drawing illustrating another alternative embodiment of the menu system of FIG. 6A, wherein the identifying indicia of the menu system are provided in a circular arrangement.
Figure 7F:
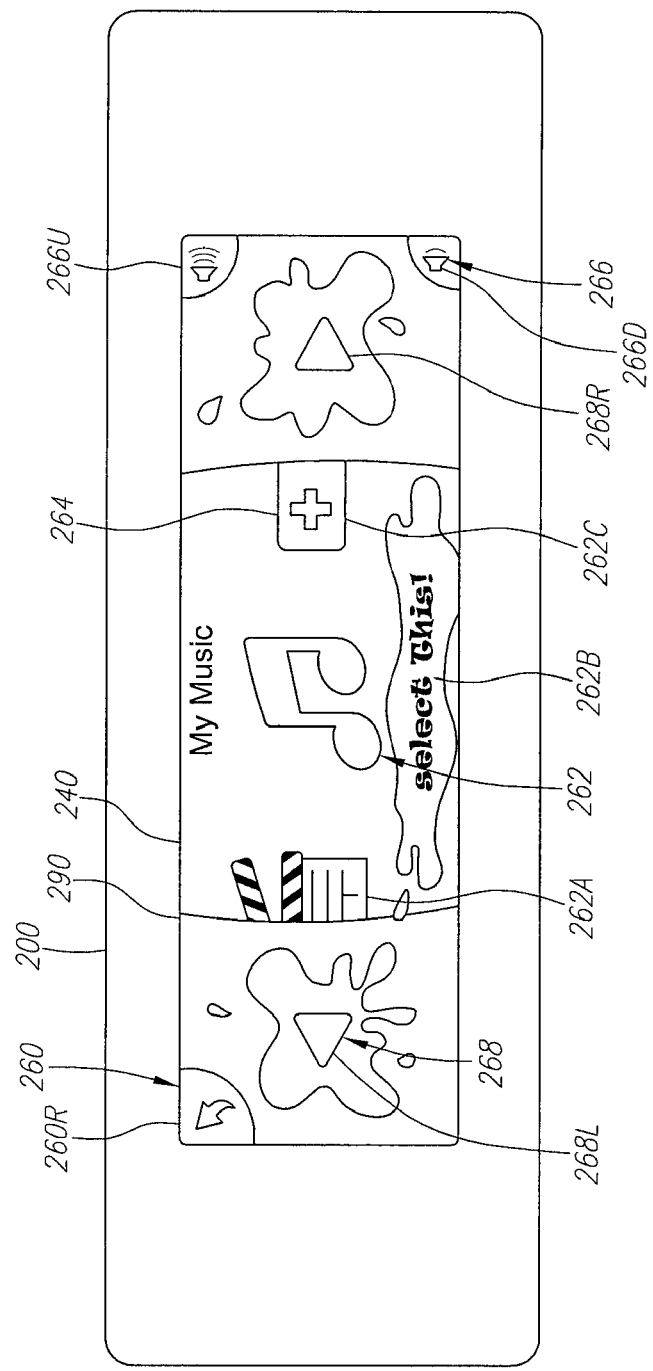
FIG. 7F is an exemplary detail drawing illustrating another alternative embodiment of the menu system of FIG. 6A, wherein the identifying indicia of the menu system are provided as customized identifying indicia.

As desired, the identifying indicia 264 for the control selections 262A-E can be provided in a circular arrangement as illustrated in FIG. 7E. The control system toolbar is disposed adjacent to the circular arrangement of the control selections 262A-E. Advantageously, the control system toolbar of FIG. 7E is shown as including selection information 296, such as a brief summary or abstract, related to the control selections 262A-E. The user interface system 290 likewise is shown as including specialized indicia 292, 294 associated with the user or, as relevant, the branding of the vehicle operator. As illustrated in FIG. 7E, the specialized indicia 292, 294 can include a stylized name and/or a logo, such as a trademarked name and/or logo, associated with the vehicle operator. FIG. 7F illustrates that the identifying indicia 264 for the control selections 262A-E can be fully customized to suit the tastes of the user or, as relevant, the branding of the vehicle operator.

Returning to FIG. 6A, the user control system 260 of the user interface system 290 can include one or more user controls 266, 268 that are at least partially integrated with the touchscreen display system, as desired. Exemplary user controls can include an audio adjustment control system 266 and/or a menu selection system 268. The audio adjustment control system 266 can be provided in any conventional manner and is shown in FIG. 6A as having an audio volume increase control 266U and an audio volume decrease control 266D. As desired, the audio adjustment control system 266 can be included with the control system toolbar discussed above with reference to FIG. 7C. The menu selection system 268 likewise can be provided in any conventional manner and enables a user to view the basic control selections 262A-E within the main menu system 262. As illustrated in FIG. 6A, the menu selection system 268 can include a left scroll control 268L and a right scroll control 268R. Advantageously, the user interface system 290 can indicate the current basic control selection 262C by highlighting or otherwise emphasizing the identifying indicia 264 associated with the current basic control selection 262C. The current basic control selection 262C of FIG. 6A has been emphasized by enlarging the associated symbol 264B; whereas, the current basic control selection 262C of FIG. 7A can be identified via the term "select," which is included within the identifying indicia 264.

Figure 6B:
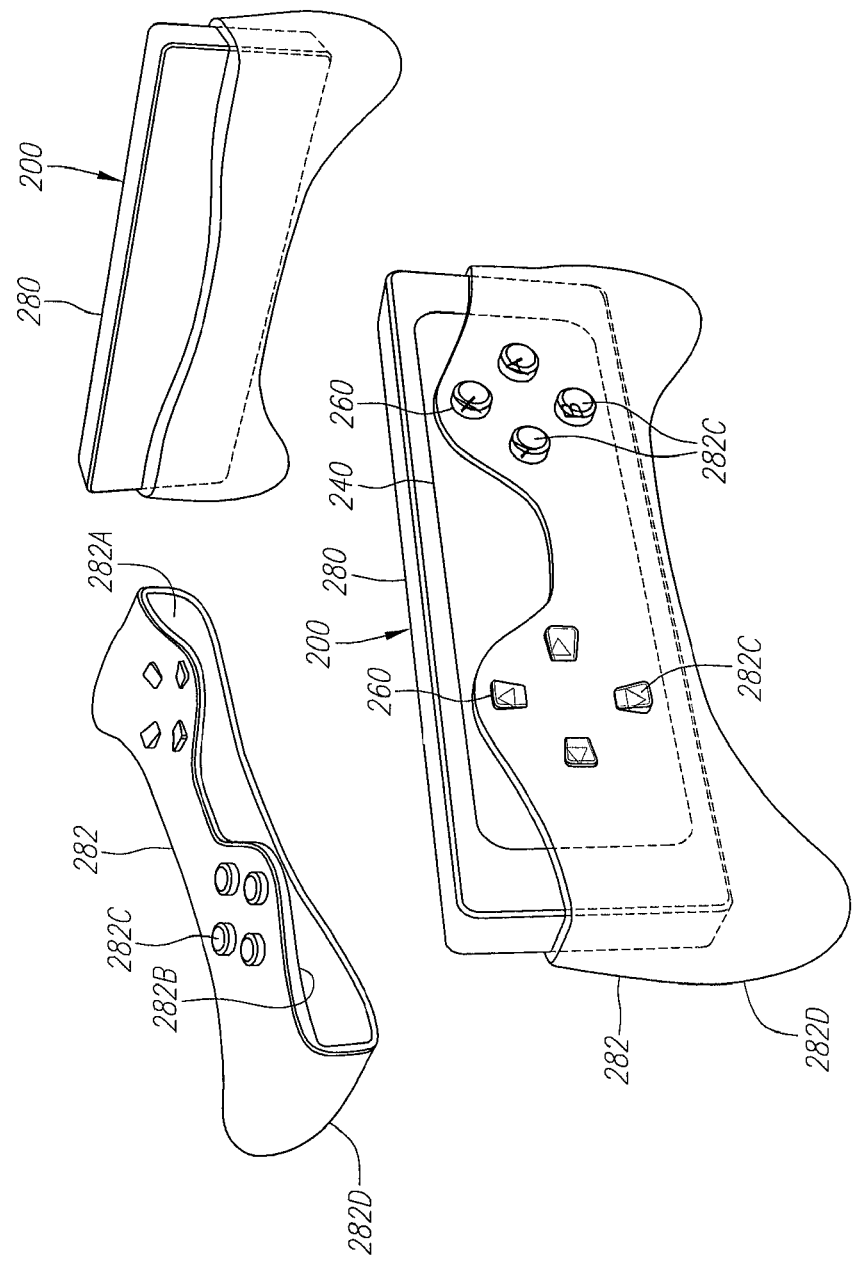
FIG. 6B is an exemplary detail drawing illustrating an embodiment of the portable control device of FIG. 6A, wherein the portable control device is disposed within an ergonomic cover assembly.

The personal user control device 200 can be disposed within a handheld case (or housing) 280. The handheld housing 280 can be provided with any suitable shape, size, texture, and/or color and is illustrated in FIG. 6A as having a rectangular shape. As desired, the personal user control device 200 can be disposed, partially and/or completely, within ergonomic (or protective) cover assembly 282, such as a cast rubber, silicon, or plastic boot, as shown in FIG. 6B. The ergonomic cover assembly 282 forms a cover opening 282A that is configured to receive the personal user control device 200 and that is defined by cover interior surfaces 282B. Alternatively, or additionally, the handheld housing 280 can be formed with the shape, size, texture, and/or color of the ergonomic cover assembly 282.

When the personal user control device 200 is received within the cover opening 282A of the cover assembly 282, the cover interior surfaces 282B engages the handheld housing 280 of the personal user control device 200 such that the cover assembly 282 provides an ergonomic grip 282D for the personal user control device 200. The cover assembly 282 likewise can provide control interfaces 282C for permitting a user to observe, activate, and otherwise interact with the user control system 260 through the cover assembly 282. Preferably, the cover assembly 282 is formed from a translucent (or transparent) material and/or the user control system 260 is illuminated to facilitate interaction with the user control system 260 via the cover assembly 282. In other words, the touchscreen display system can project colors, text, and/or symbols associated with the user control system 260 through the cover assembly 282 such that the user control system 260 is visible. As desired, the personal user control device 200 subsequently can be separated from the cover assembly 282.

Figure 6C:
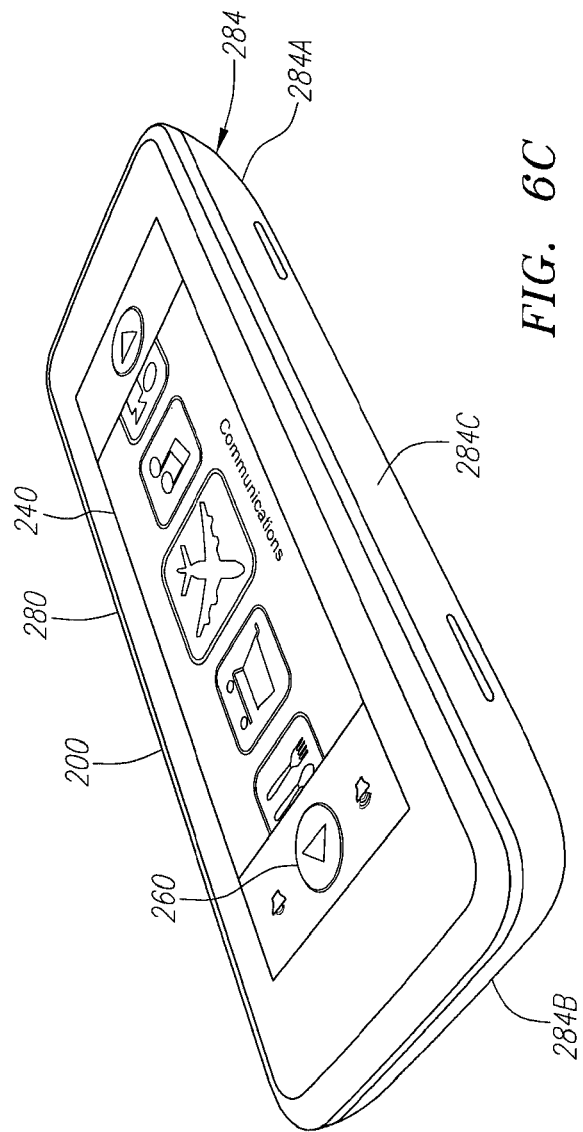
FIG. 6C is an exemplary detail drawing illustrating an alternative embodiment of the portable control device of FIG. 6A, wherein the handheld housing includes tapered housing regions.
Figure 6D:
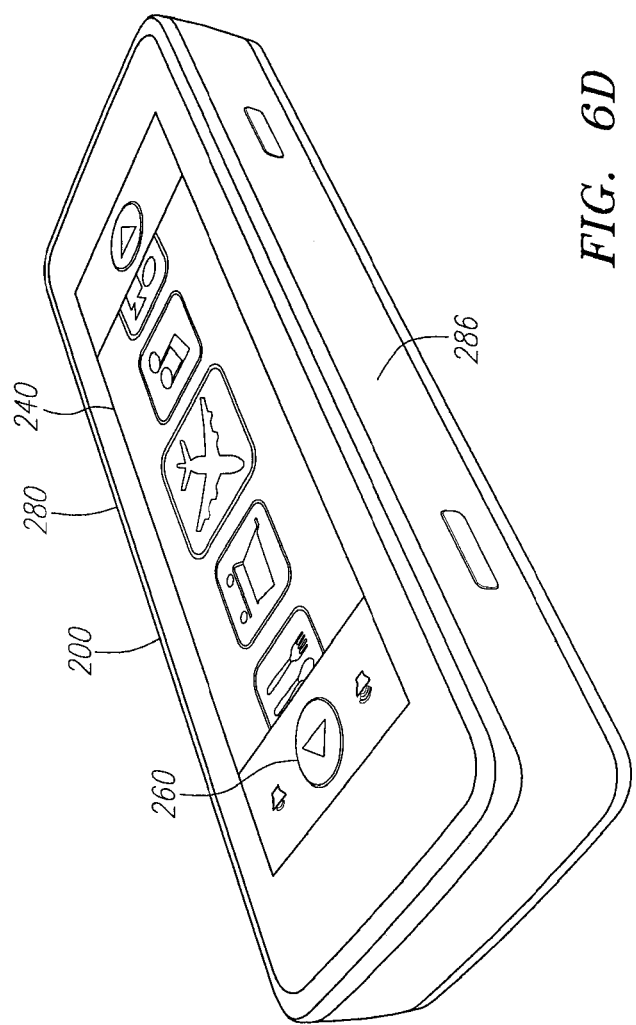
FIG. 6D is an exemplary detail drawing illustrating another alternative embodiment of the portable control device of FIG. 6A, wherein the handheld housing can be customized with branding indicia.

To further enhance the ergonomic form of the personal user control device 200, the handheld housing 280 can be provided with one or more tapered (or contoured) housing regions 284 as illustrated in FIG. 6C. The tapered housing regions 284 can be provided on any suitable surface of the handheld housing 280 and are provided in a manner that makes the personal user control device 200 more comfortable to hold. For example, the handheld housing 280 is shown as having tapered opposite end regions 284A, 284B. The handheld housing 280 likewise can include at least one tapered side regions 284C, as desired. The shape, size, texture, and/or color of the handheld housing 280 can be readily provided in a manner that suits the tastes of the user or, as relevant, the branding of the vehicle operator. The personal user control device 200 likewise can include identifying indicia, such as text and/or a symbol (or icon), on the handheld housing 280. As shown in FIG. 6D, a colored band 286 can be disposed on a side region of the handheld housing 280.

Figure 8A:
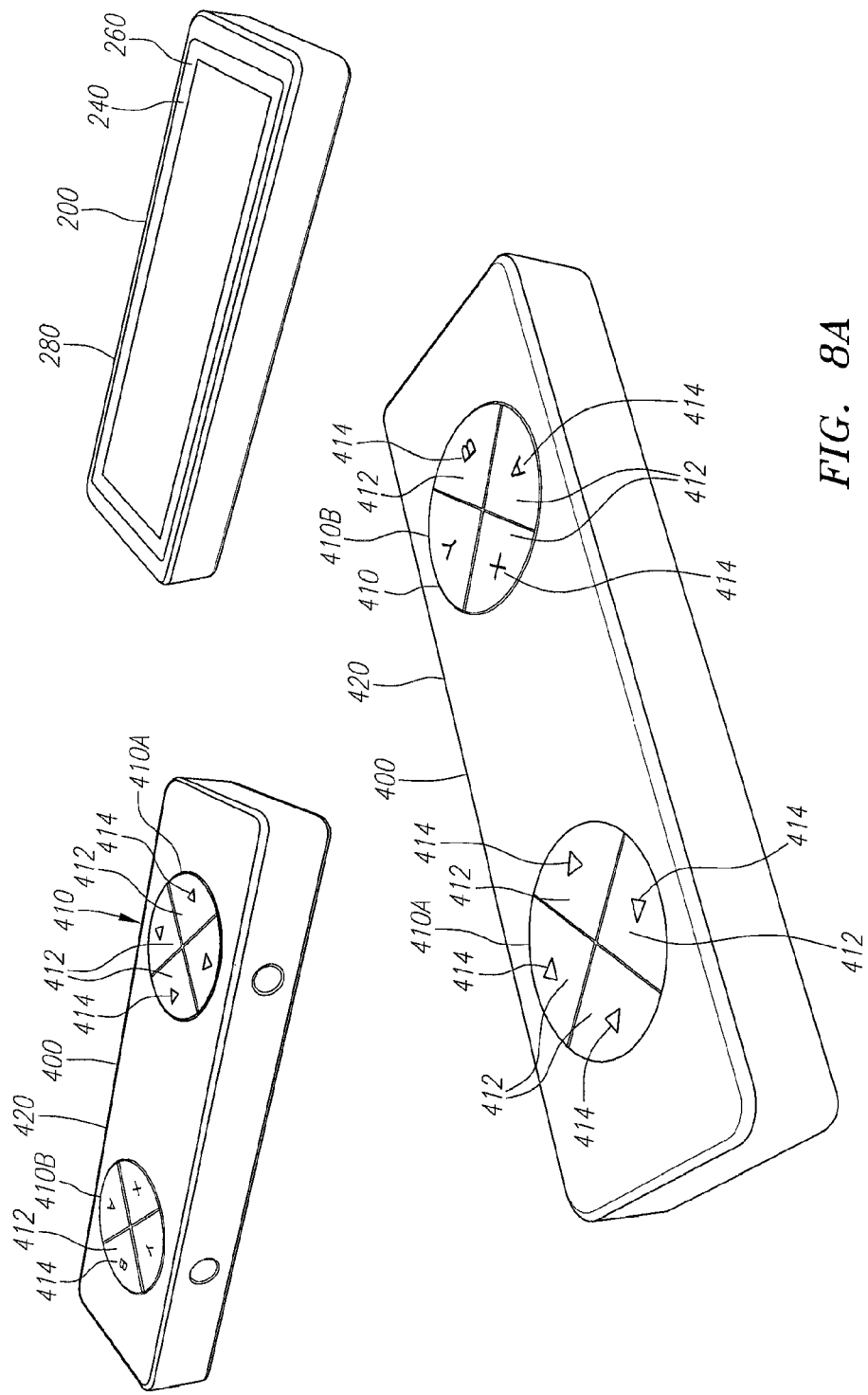
FIG. 8A is an exemplary detail drawing illustrating an embodiment of the portable control device of FIGS. 6A-D, wherein the portable control device includes touchscreen display system and cooperates with a display overlay system.

In the manner set forth above with reference to FIGS. 6A-D, the video display system 240 and the user control system 260 of the personal user control device 200 can be provided as a touchscreen display system that is disposed on (and/or within) the handheld housing 280. Turning to FIG. 8A, a display overlay system 400 is shown for use in conjunction with the personal user control device 200. The personal user control device 200 and the display overlay system 400 can be provided as separate systems, as illustrated in FIG. 8A, and/or can be at least partially integrated (or coupled). The display overlay system 400 includes an overlay housing 420 that is configured to cooperate with the handheld housing 280 of the personal user control device 200. As shown in FIG. 8A, the overlay housing 420 forms an overlay opening (not shown) for receiving, and engaging, the handheld housing 280. The display overlay system 400 and the personal user control device 200 thereby can couple. As desired, the overlay housing 420 subsequently can disengage the handheld housing 280 such that the display overlay system 400 and the personal user control device 200 are removably coupled.

The display overlay system 400 includes at least one user controller interface portion 410. Each user controller interface portion 410 includes one or more button regions 412 that can be pressed by a user and that, if pressed, can contact corresponding locations of the touchscreen display system when the display overlay system 400 and the personal user control device 200 are coupled. The user thereby interacts with the touchscreen display system of the personal user control device 200 via the display overlay system 400. By associating (or mapping) a predetermined function with each location of the touchscreen display system, activation of a selected button region 412 of a selected user controller interface portion 410 can initiate the predetermined function. The personal user control device 200 can be configured for use with a plurality of the display overlay systems 400 with different numbers, configurations, and/or arrangements of the user controller interface portion 410 such that the user interface system 290 (shown in FIG. 4B) of the personal user control device 200 can be readily customized. In other words, the personal user control device 200 can be customized via selection of an appropriate display overlay system 400.

As shown in FIG. 8A, the display overlay system 400 can have two user controller interface portions 410A, 410B each including four button region 412. Each controller interface portions 410A, 410B can include any suitable number, arrangement, and/or configuration of button regions 412. The button region 412 of FIG. 8A can be flush with the overlay housing 420 and provide tactile feedback. Preferably, the button regions 412 are associated with identifying indicia 414 for identifying the functions associated with the button regions 412. The identifying indicia 414 for the first user controller interface portion 410A is shown as comprising directional arrows; whereas, the identifying indicia 414 for the second user controller interface portion 410B can include text, numbers, or letters. Although shown and described as being button regions 412 for purposes of illustration only, the user controller interface portions 410 can comprise any conventional type of control interface, such as a pushbutton switch, a rocker switch, a slider switch (or game pad) (shown in FIG. 8B), a rotatable switch, and/or a toggle switch, without limitation.

The identifying indicia 414 can be associated with the button regions 412 in any conventional manner. For example, the identifying indicia 414 can be formed, or applied, on the overlay housing 420. The identifying indicia 414 can be formed from cutout regions formed within the button regions 412 such that light from the touchscreen display system of the personal user control device 200 can pass through the cutout regions. The light from the touchscreen display system can be provided with any suitable color and/or luminance. As desired, the button regions 412 of the display overlay system 400 likewise can be formed from a translucent (or transparent) material. The identifying indicia 414 thereby can be presented as a display graphic by the touchscreen display system of the personal user control device 200 and seen through the translucent button regions 412. The button regions 412 can be disposed within a user interface region 450 (shown in FIG. 8C) of the display overlay system 400, and at least a portion of the user interface region 450 can be formed from a translucent (or transparent) material.

Preferably, the identifying indicia 414 illuminate or otherwise become visible only when the associated button regions 412 are active (or in use) and blend into the overlay housing 420 when the associated button regions 412 are not active. If a selected controller interface portion 410 is associated with a game controller, for example, the identifying indicia 414 associated with the selected controller interface portion 410 can illuminate when the personal user control device 200 (or the vehicle information system 300) enters a game mode. For example, FIG. 8B shows that the display overlay system 400 can include a switching system 430 for activating a game mode of the personal user control device 200.

Figure 8B:
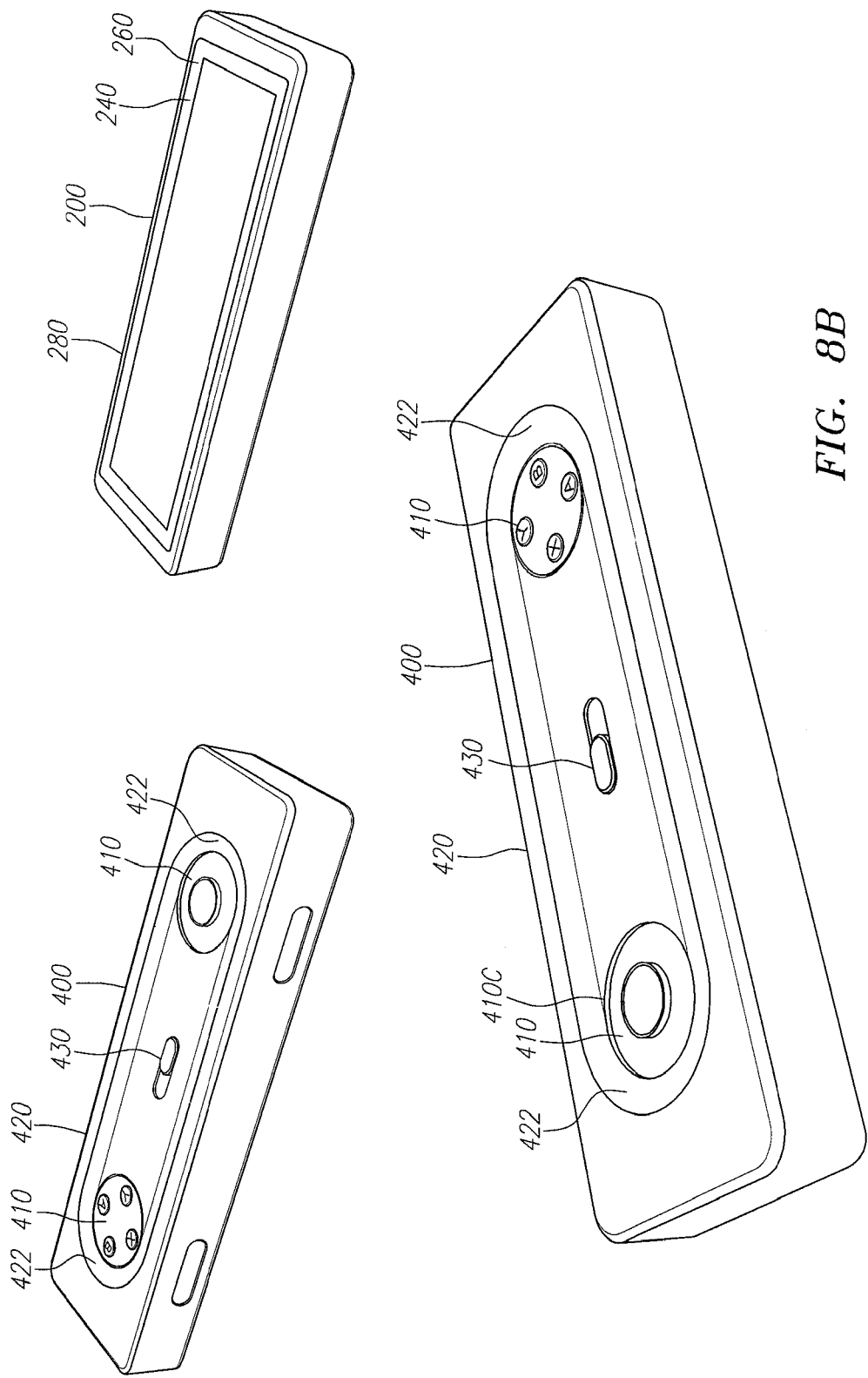
FIG. 8B is an exemplary detail drawing illustrating an embodiment of the display overlay system of FIG. 8A, wherein the display overlay system includes a recess region for recessing an associated user controller interface portion within the overlay housing.

One manner for recessing the controller interface portion 410 within the overlay housing 420 of the display overlay system 400 is illustrated in FIG. 8B. As shown in FIG. 8B, the overlay housing 420 can provide a recessed (or dished-out) region 422 adjacent to an associated controller interface portion 410. The recessed region 422 of the overlay housing 420 inhibits the associated controller interface portion 410 from extending beyond the surface of the overlay housing 420. In other words, the recessed region 422 enables the controller interface portion 410 to be mounted flush with the overlay housing 420.

Figure 8C:
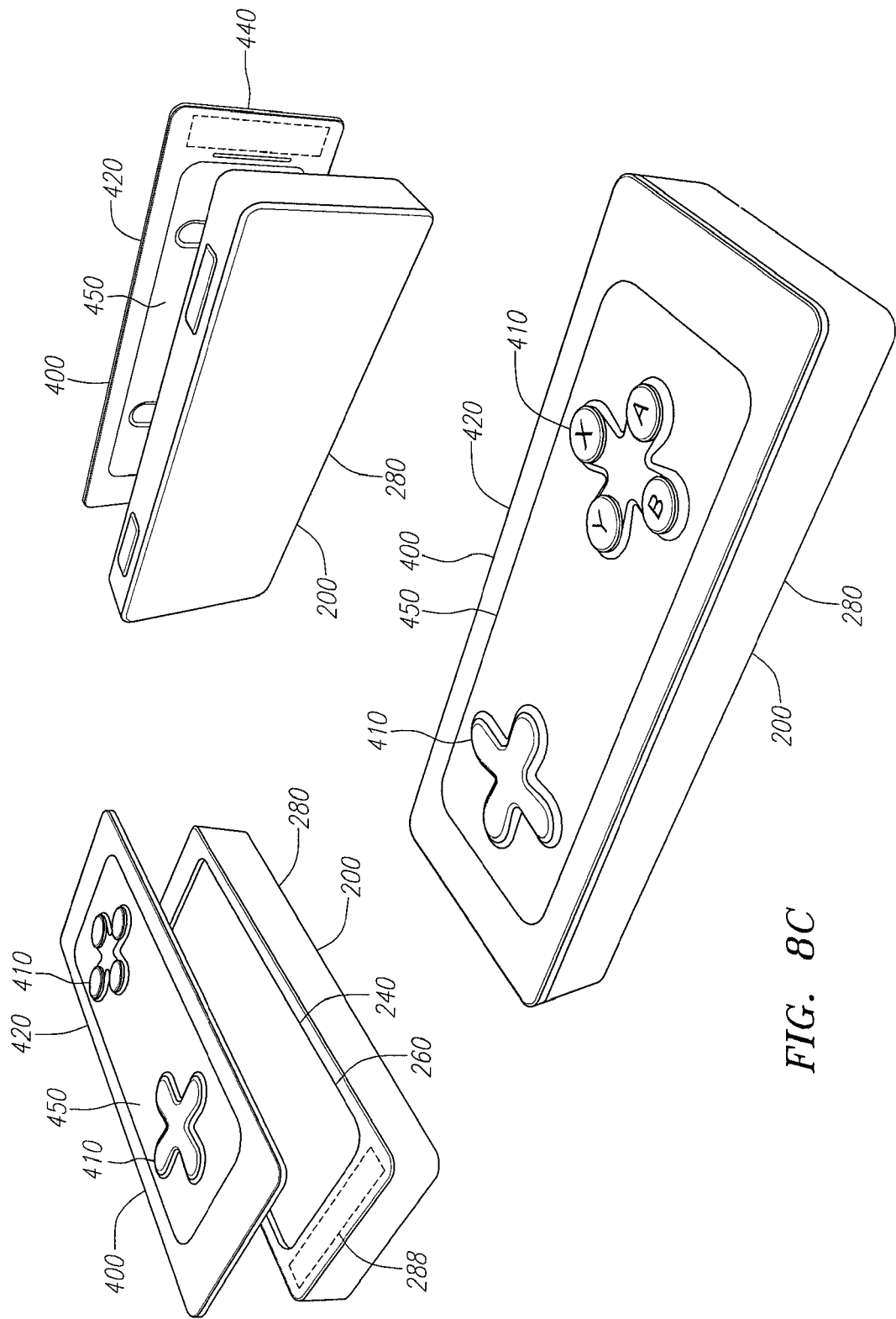
FIG. 8C is an exemplary detail drawing illustrating an alternative embodiment of the display overlay system of FIG. 8A, wherein the display overlay system removably couples with the portable control device via a magnetic coupling system.

The display overlay system 400 can be coupled with (or disposed on) the handheld housing 280 of the personal user control device 200 in any conventional manner. To facilitate customization of the user interface system 290 (shown in FIG. 4B) presented by the handheld housing 280, the display overlay system 400 preferably is removably and/or adjustably coupled with the handheld housing 280. Turning to FIG. 8C, for example, the display overlay system 400 can include an overlay magnetic coupling system 440 that is adapted to communicate with a device magnetic coupling system 288 of the personal user control device 200. The overlay magnetic coupling system 440 can be provided at one or more suitable regions of the overlay housing 420 and can be disposed within (or on a surface of) the overlay housing 420. Similarly, the device magnetic coupling system 288 can be provided at one or more suitable regions of the handheld housing 280 and can be disposed within (or on a surface of) the handheld housing 280. Thereby, the display overlay system 400 can be provided as a removable face plate for the personal user control device 200 and can engage the personal user control device 200.

Figure 8D:
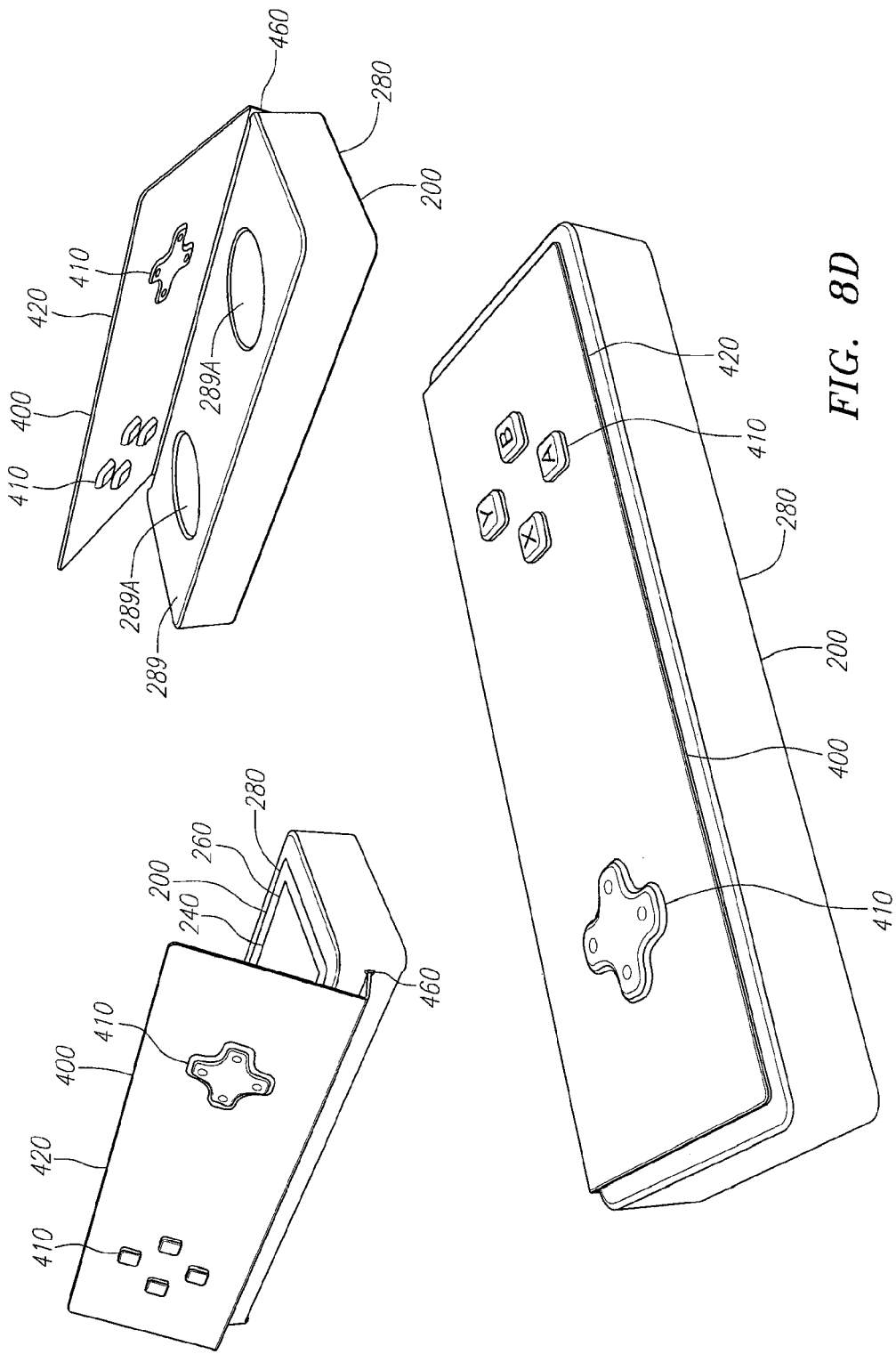
FIG. 8D is an exemplary detail drawing illustrating another alternative embodiment of the display overlay system of FIG. 8A, wherein the display overlay system couples with the portable control device via a mechanical coupling system.

Alternatively, and/or additionally, the display overlay system 400 can be rotatably coupled with the handheld housing 280 of the personal user control device 200. As shown in FIG. 8D, for example, a hinge system 460 can couple the display overlay system 400 and the handheld housing 280. The hinge system 460 can be provided in any conventional manner and can be connect to any suitable surface of the overlay housing 420 and/or the handheld housing 280. The display overlay system 400 thereby can be rotated adjacent to the touchscreen display system of the personal user control device 200 to provide the user interface system 290 (shown in FIG. 4B). The display overlay system 400 likewise can be rotated away from the touchscreen display system when not in use. As shown in FIG. 8D, the handheld housing 280 can advantageously include a storage surface 289, such as a back surface (or a surface opposite the touchscreen display system), of the handheld housing 280. The hinge system 460 thereby can dispose the display overlay system 400 adjacent to the storage surface 289 when the display overlay system 400 is not in use. As desired, the storage surface 289 can form one or more recesses 289A for receiving the user controller interface portion 410 when the display overlay system 400 adjacent to the storage surface 289.

Figure 8E:
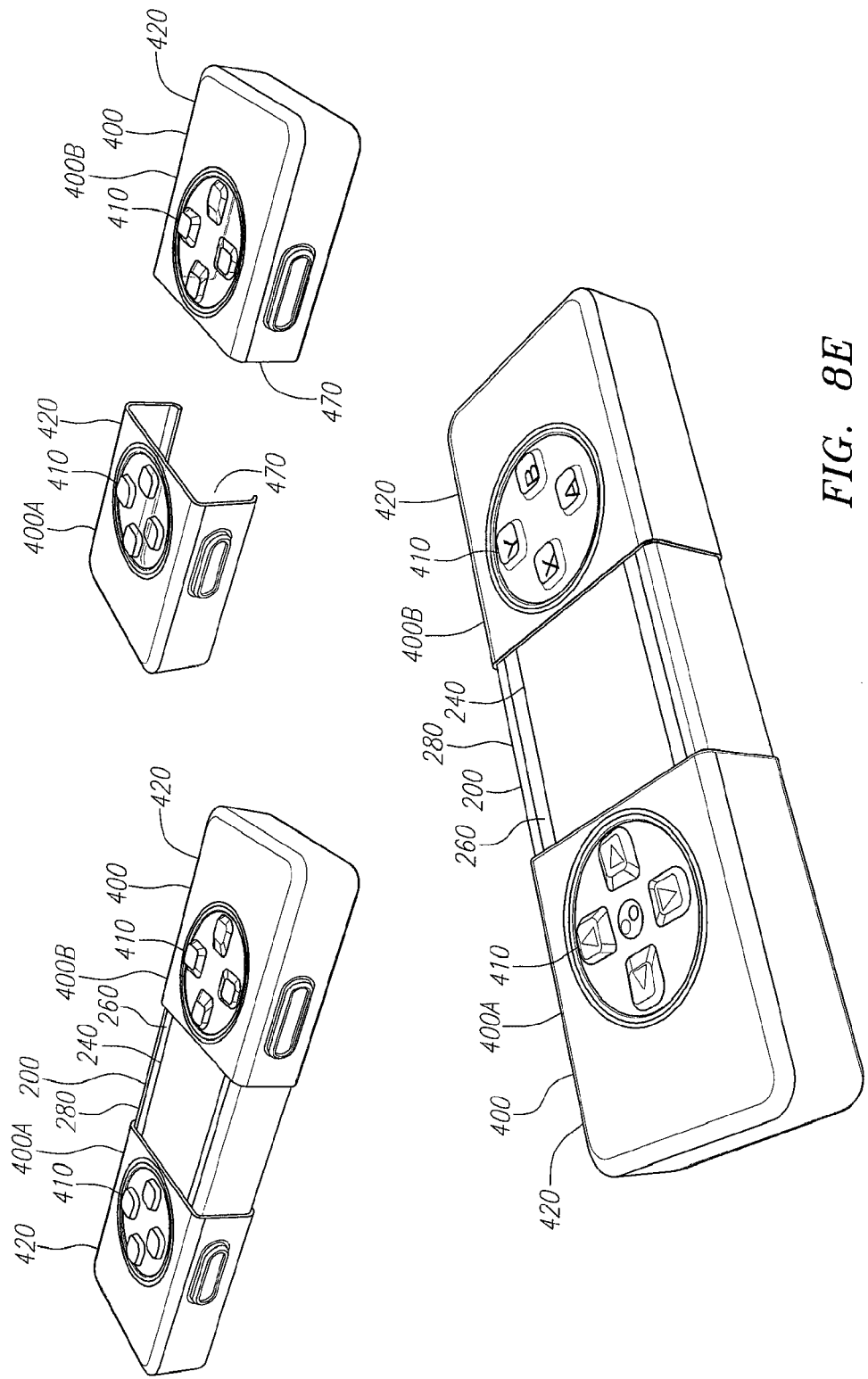
FIG. 8E is an exemplary detail drawing illustrating another alternative embodiment of the display overlay system of FIG. 8A, wherein the display overlay system is provided as a pair of display overlay systems.

Turning to FIG. 8E, the display overlay system 400 can be provided as a plurality of separate display overlay subsystems 400A, 400B. The display overlay system 400 is shown in FIG. 8E as comprising two overlay subsystems 400A, 400B. The overlay housing 420 of each overlay subsystems 400A, 400B forms an opening 470 for receiving a selected portion of the handheld housing 280 of the personal user control device 200. The overlay subsystems 400A, 400B each can receive any suitable portion of the handheld housing 280 and are illustrated in FIG. 8E as receiving opposite end regions of the handheld housing 280. When coupled with the handheld housing 280, the overlay subsystems 400A, 400B can extend partially, as shown in FIG. 8E, and/or completely over the touchscreen display system of the personal user control device 200. At least a portion of the touchscreen display system between the overlay subsystems 400A, 400B can remain exposed if the overlay subsystems 400A, 400B extend partially over the touchscreen display system. The overlay subsystems 400A, 400B thereby can be formed as opaque rubber (or plastic) grips with one or more translucent (or transparent) plastic user controller interface portions 410. After use, the overlay subsystems 400A, 400B can be stacked to save space.

When configured (or customized) for use as a game controller, the personal user control device 200 can provide a suitable number, configuration, and/or arrangement of the user controller interface portion 410 such that the user interface system 290 (shown in FIG. 4B) of the personal user control device 200 is customized for use with a selected game. In one preferred embodiment, the user interface system can have a game control system (not shown) built into the personal user control device 200. The game control system is not presented until game mode is selected, and any relevant game parts are retracted from the personal user control device 200.

The personal user control device 200 provides a versatile and intuitive user interface system 290 that can readily be customized for use in any conventional user environment, such as in the home. As desired, the personal user control device 200 can be provided as a telephone (not shown). When provided as a telephone, the personal user control device 200 can operate as a dual landline telephone and/or an Internet Protocol (IP) telephone. The user can select a telephone communication protocol, and/or a default telephone communication protocol can be identified during device setup. For emergency telephone calls, such as 9-1-1 calls, a landline telephone communication protocol is automatically selected. The personal user control device 200 thereby can provide standard home telephone capabilities, including advanced features such as photographs, text messaging, and/or video (or animated) caller identification. The personal user control device 200 likewise can provide customized user-specific capabilities when provided as a telephone. Exemplary customized user-specific capabilities can include an integrated soft-keyboard, a large text format for elderly (or vision-impaired) users, a baby-sitter mode for providing important telephone numbers, a fun, whimsical interface system 290 for children, and host (or bridge) contact information for electronic mail (and other) contacts and/or a wireless communication link to cellular data.

The personal user control device 200 advantageously provides a wide-ranging noise-canceling microphone (not shown) to facilitate state-of-the-art telephone and video conferencing. The personal user control device 200 can be coupled with an information system 100 (shown in FIG. 1) via Internet Protocol (IP) technology. A stereo and/or a television thereby can be used to enhance family and business conversations. The personal user control device 200 also supports a speakerphone mode for simple, hands-free communication.

If an enhanced user control system 260 (shown in FIG. 4B) is desired, the personal user control device 200 can dock with one or more peripheral user devices (not shown). The personal user control device 200 can dock with a specially-fitted keyboard system that can be used, for example, to access the Internet, to type a document, and/or to send an electronic mail (email) message. The personal user control device 200 thereby can be used as a feedback mechanism for the keyboard system. Preferably, the keyboard system is provided as a dumb device without a communication link and/or batteries such that the personal user control device 200 can be operated as a modem. The personal user control device 200 can dock with the keyboard system in any conventional manner, including via a magnetic coupling system.

When the personal user control device 200 is used in the home, the menu system can be used to control a home security system, including security devices, security lighting, and/or security blinds. The personal user control device 200, for example, can continue to control the home security system remotely from outside the house, such as during travel aboard a passenger vehicle 390 (shown in FIGS. 2A-B). Home closed circuit television security footage likewise can be viewed via the personal user control device 200 before entering the home. As needed, the personal user control device 200 can remotely monitor the home security system and present a security alert if an alarm system has been activated.

The personal user control device 200 likewise can advantageously operate as a universal remote control system. The personal user control device 200 can be configured to be compatible with any conventional media system, such as an entertainment system. Thereby, the personal user control device 200 can provide remote control and otherwise interact with the media system. The personal user control device 200, for example, can enable and remotely interact with an Internet Protocol television (IPTV) system, a conventional television system, and any other conventional entertainment system. As desired, the personal user control device 200 can provide remote command and control for an iPod® digital electronic media device and/or an iPhone® digital electronic media device each as manufactured by Apple Computer, Inc., of Cupertino, Calif. The personal user control device 200 thereby can control and manipulate a playlist of the iPod® digital electronic media device and/or the iPhone® digital electronic media device.

The versatile and intuitive user interface system 290 of the personal user control device 200 likewise can be customized for use in a vehicle 390 (shown in FIGS. 2A-B), such as an automobile 390A (shown in FIG. 2A) and/or an aircraft 390B (shown in FIG. 2B). Advantageously, the personal user control device 200 can provide a seamless experience between the home and the vehicle 390. The personal user control device 200, for example, can carry personalized data and authentication credentials and/or can extend a wireless network interface to the vehicle 390. As desired, the personal user control device 200 likewise can bridge a landline telephone system between the home and the vehicle 390. A user thereby can initiate and/or receive home telephone calls via the personal user control device 200 while traveling in the vehicle 390.

The personal user control device 200 can use a telephone network interface, such as an integrated cellular network interface, and Internet Protocol (IP) characteristics of a home base station. The telephone calls can be conducted (or presented) in any conventional manner, such as via a telephone interface (not shown) installed in the vehicle 390. In a preferred embodiment, the personal user control device 200 can be used to conduct the telephone calls. When used to initiate and/or receive home telephone calls, the personal user control device 200 advantageously enables the telephone calls to be conducted with consistency, user convenience, and/or personalization for elderly (or young) users.

When used in the vehicle 390, the personal user control device 200 likewise can advantageously operate as a universal remote control system. The personal user control device 200 thereby can be configured to be compatible for use with any conventional vehicle information system 300, including a vehicle entertainment system. For example, the personal user control device 200 can provide control for a video presentation system 362 (shown in FIGS. 4A-B) and/or an audio presentation system 364 (shown in FIGS. 4A-B) of the vehicle information system 300.

The personal user control device 200 can support remote command and control, such as a control signal 220 (shown in FIGS. 2A-B), for a personal media device (not shown) provided in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, and the above-referenced related nonprovisional patent applications: "MEDIA DEVICE INTERFACE SYSTEM AND METHOD FOR VEHICLE INFORMATION SYSTEMS," Ser. No. 12/210,636, filed Sep. 15, 2008; and "MEDIA DEVICE INTERFACE SYSTEM AND METHOD FOR VEHICLE INFORMATION SYSTEMS," Ser. No. 12/210,652, filed Sep. 15, 2008. As desired, the personal media device can be provided as an iPod® digital electronic media device and/or an iPhone® digital electronic media device each as manufactured by Apple Computer, Inc., of Cupertino, Calif.

If the personal media device comprises an iPod® digital electronic media device and/or an iPhone® digital electronic media device, for example, the personal user control device 200 can communicate with the iPod® digital electronic media device and/or the iPhone® digital electronic media device in the manner set forth in the above-referenced related nonprovisional patent applications: "SYSTEM AND METHOD FOR INTERFACING A PORTABLE MEDIA DEVICE WITH A VEHICLE INFORMATION SYSTEM," Ser. No. 12/210,624, filed Sep. 15, 2008; "MEDIA DEVICE INTERFACE SYSTEM AND METHOD FOR VEHICLE INFORMATION SYSTEMS," Ser. No. 12/210,636, filed Sep. 15, 2008; and "MEDIA DEVICE INTERFACE SYSTEM AND METHOD FOR VEHICLE INFORMATION SYSTEMS," Ser. No. 12/210,652, filed Sep. 15, 2008.

The personal user control device 200 thereby can provide command and control for the iPod® digital electronic media device and/or the iPhone® digital electronic media device. In one preferred embodiment, the personal user control device 200, when used in the vehicle 390, can provide command and control for the iPod® digital electronic media device and/or the iPhone® digital electronic media device even if the iPod® digital electronic media device and/or the iPhone® digital electronic media device remain docked at home. As desired, the personal user control device 200 can provide personalized menu system for each automobile passenger.

The personal user control device 200 can be customized to operate as a removable in-dash face plate system in a manner similar to conventional vehicular dash face plate systems, such as automotive in-dash plate systems. When used as a removable dash face plate systems, the personal user control device 200 can provide personalized user settings, including personalized user home-to-vehicle settings and/or personalized user vehicle-to-vehicle settings.

The personal user control device 200 likewise can be associated with a vehicle navigation system (not shown). As desired, the personal user control device 200 can comprise the vehicle navigation system and/or can be customized to cooperate with a conventional vehicle navigation system. The personal user control device 200 thereby can provide personalized (or removable) point-of-interest (POI) information and/or can be associated with (or tied to) a Churchill strategy.

When used in the vehicle 390, the personal user control device 200 likewise can advantageously operate as a game control system. The personal user control device 200 can be used in conjunction with an add-on game control to customize the personal user control device 200 for operation as a gaming handset. Thereby, the personal user control device 200 can facilitate game continuity. In other words, the personal user control device 200 can use a wireless interface system and/or a physical interface system to pick up an existing game where the game had been left off. Game continuity can be provided via a conventional tag system. As desired, the personal user control device 200 can enable a wireless communication link to selected games. Exemplary selected games can include simple games and/or low-bandwidth games available via the Internet 310C (shown in FIG. 2B).

The personal user control device 200 advantageously can be employed as a vehicle safety system. When used in an automobile 390A, for example, the personal user control device 200 can replace (and/or supplement) a mirror system by presenting real-time views provided by a vehicle camera system (not shown). The personal user control device 200 can provide a wired and/or wireless camera interface system for interacting with a rear view vehicle camera system installed aboard the automobile 390A. The personal user control device 200 thereby can present a rear view from the automobile 390A rather than relying solely on rear view vehicle mirror systems. The personal user control device 200 thereby can enhance the functionality of the vehicle camera system. As desired, a vehicle camera system can be installed at any conventional vehicle mirror system location. Standard in-dash features likewise can be migrated to these locations. If customized to operate as a removable in-dash face plate system in the manner set forth above, the personal user control device 200 can provide conventional face plate functionality while enhancing the functionality of the vehicle camera system.

As desired, the personal user control device 200 can be customized to operate any conventional vehicle system. For example, the personal user control device 200 can be customized to operate as a conventional smart key system. The personal user control device 200 thereby can support providing entry authorization to the vehicle 390. Advantageously, the personal user control device 200 can include programmable, personalized settings for one or more vehicles 390. The personal user control device 200 can automatically detect the relevant vehicle 390. The personal user control device 200 likewise can provide control for the manipulation of an electronic passenger seat 382 (shown in FIGS. 4A-B). Thereby, existing conventional controls for manipulating the passenger seat 382 can be eliminated from the vehicle 390. The passenger seat 382 preferably can be manipulated via the personal user control device 200 at any suitable time, including when an engine system of the vehicle 390 is not activated (or on).

The personal user control device 200 likewise can be adapted to readily switch among a plurality of user interface systems 290. For example, the personal user control device 200 can present a first user interface systems 290 with an interactive look for adults. Upon entry of a preselected authorization code, the personal user control device 200 can present a second user interface systems 290 with an interactive look suitable for children. When installed aboard a passenger vehicle 390 (shown in FIGS. 2A-B), the availability of user interface systems 290 can be based upon selected predetermined criteria. The user interface system 290, for instance, can be made to look like the destination city. If the predetermined criteria comprises passenger class (first class, premium class, business class, economy class, and/or coach class), the personal user control device 200 can present a user interface system 290 that is suitable for use with the viewing content accessible in accordance with the relevant passenger class. The selection of the interface systems 290 can be preformed automatically based, for example, on passenger manifests and/or frequent flyer programs. As desired, the personal user control device 200 can include a conventional card reader for authorizing enhanced device functionality. The card reader can be configured to read credit cards, frequent flyer cards, etc.

Figure 9A:
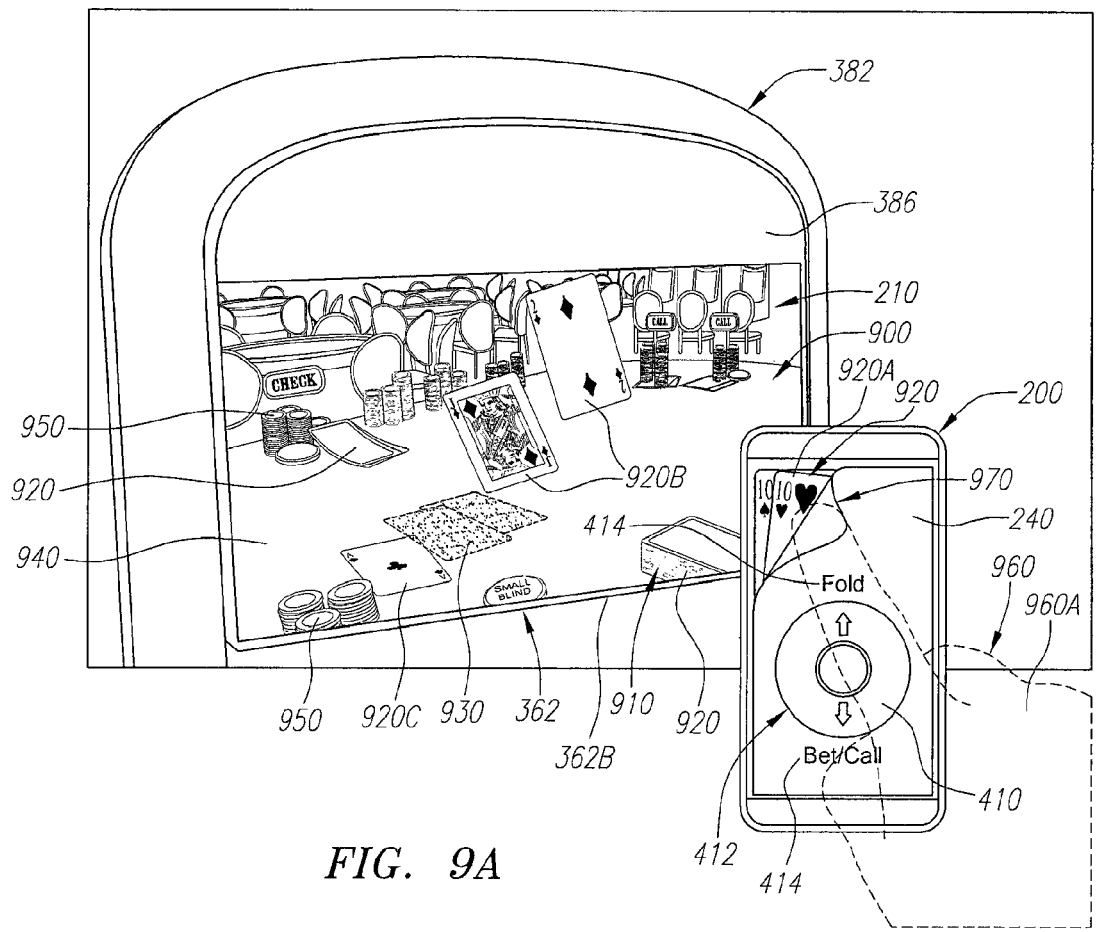
FIG. 9A is an exemplary detail drawing illustrating an embodiment of an application of the portable control device of FIGS. 8A-E, wherein the portable control device is adapted for use with multiplayer games.

The personal user control device 200 advantageously can be applied in a wide range of applications. In one embodiment, the personal user control device 200 can be adapted for use as a customized remote control with multiplayer games, such as card games, board games, arcade games, computer games, and the like without limitation. The personal user control device 200, for example, is illustrated in FIG. 9A as being configured for use with a poker game 900. Turning to FIG. 9A, each poker player 960 can interact with the poker game 900 via a combination of a personal user control device 200 and a separate video interface system 362, such as a respective seatback display system 362B disposed on an adjacent passenger seat 382. The respective seatback display systems 362B can present a central gaming surface (or location), such as a virtual poker table 940, and other indicia associated with the poker game 900, simulating the experience of being physically positioned at a tangible poker table (not shown). Preferably, the seatback display systems 362B present the poker table 940 from different perspectives (and/or angles) to provide an effect of sitting around the poker table 940. Two or more poker players 960 can share a common seatback display system 362B, as desired.

The poker game 900 is played in accordance with conventional poker rules, in which the poker players 960 act in turn. Alternatively, and/or additionally, the personal user control devices 200 preferably are activated in a predetermined sequence (or order) for inhibiting the poker players 960 from participating out of turn. As illustrated in FIG. 9A, each poker player 960 can be associated with one or more wagering tokens (or poker chips) 950 of at least one denomination and can be dealt at least one playing card 920 from a card deck 910. A selected poker player 960A can actively participate in the poker game 900 via a personal user control device 200A in the same manner by which he would participate in the poker game 900 if seated at the tangible poker table. The personal user control device 200A enables the selected poker player 960A to communicate with the other poker players 960. The selected poker player 960A, for example, can place a bet, request one or more playing cards 920, and/or discard one or more playing cards 920 at appropriate times during the poker game 900.

During a betting phase of the poker game 900, for example, the user controller interface portion 410 of the personal user control device 200A can provide a customized interface with button regions 412 with identifying indicia 414 for permitting the selected poker player 960A to place a bet, raise, call, or fold as shown in FIG. 9A. The customized interface of the personal user control device 200A likewise can include button regions 412 with suitable identifying indicia 414 to enable the selected poker player 960A to request one or more playing cards 920 and/or discard one or more playing cards 920. As desired, the personal user control device 200A can download the customized interface, for example, via an information system 100 (shown in FIG. 1) and/or a vehicle information system 300 (shown in FIGS. 2A-B) that is hosting the poker game 900.

The playing cards 920 dealt to the selected poker player 960A can include one or more concealed playing cards (or hole cards) 920A that are dealt in a face down manner and/or exposed playing cards (or upcards) 920C that are dealt face up. Advantageously, the hole cards 920A that are dealt to the selected poker player 960A can be privately viewed via the integrated video display system 240 of the personal user control device 200A; whereas, the upcards 920C can be presented to each poker player 960 via the seatback display systems 362B. By judiciously holding the personal user control device 200A, the selected poker player 960A can inhibit other poker players 960 from viewing the hole cards 920A. The integrated video display system 240 likewise can present a virtual covering 970 for concealing the hole cards 920A from the other poker players 960. The virtual covering 970 can be temporarily removed, in whole and/or in part, to reveal at least part of the hole cards 920A. As illustrated in FIG. 9A, for example, the selected poker player 960A can curl up a corner of the virtual covering 970 to view the hole cards 920A by actuating a relevant portion of the integrated video display system 240 with his hand or finger.

As desired, the seatback display systems 362B can include additional animation to further enhance the natural participation in the poker game 900. Real and/or computer-generated images (or avatars) (not shown) of one or more other poker players 960 in the poker game 900 can be presented on the seatback display systems 362B. Additionally, and/or alternatively, the seatback display systems 362B can present a path of dealt cards 920B from the card deck 910 to the personal user control device 200A and/or a path of discarded cards 920B from the personal user control device 200A to the virtual poker table 940. Similarly, a suitable collection of one or more poker chips 950 representing the amount of a wager can be shown by the seatback display systems 362B as being removed from the wagering poker player 960 and moving into the common pot of poker chips 950. When a poker player 960 wins the hand, the pot of poker chips 950 can be shown as moving to the winning poker player 960 and being added to the poker chips 950 associated with the winning poker player 960. Further effects, such as shadows 930 of the dealt and/or discarded cards 920B likewise can be presented via the seatback display systems 362B. Thereby, the interface of the personal user control device 200 in combination with the seatback display system 362B promotes natural participation and interaction with the poker game 900 while supporting private betting and hold card viewing.

Although shown and described with reference to a poker game 900 presented on video interface systems 362 for purposes of illustration only, the personal user control device 200 can provide a customized interface for any conventional multiplayer game and can be configured for use in any suitable gaming environment. If applied to a multiplayer scrabble game, for example, the personal user control device 200 can hold letter tiles (not shown) drawn by the relevant player. The exemplary suitable gaming environments including can include a building, such as an arcade, casino, or home, wherein a television, computer screen, or any other conventional display system serves as the seatback display system 362B for presenting the virtual poker table 940 and other indicia associated with the poker game 900 in the manner set forth above. For example, in a tavern, the virtual poker table 940 and other indicia can be presented via a viewing screen disposed within the bar.

Figure 9B:
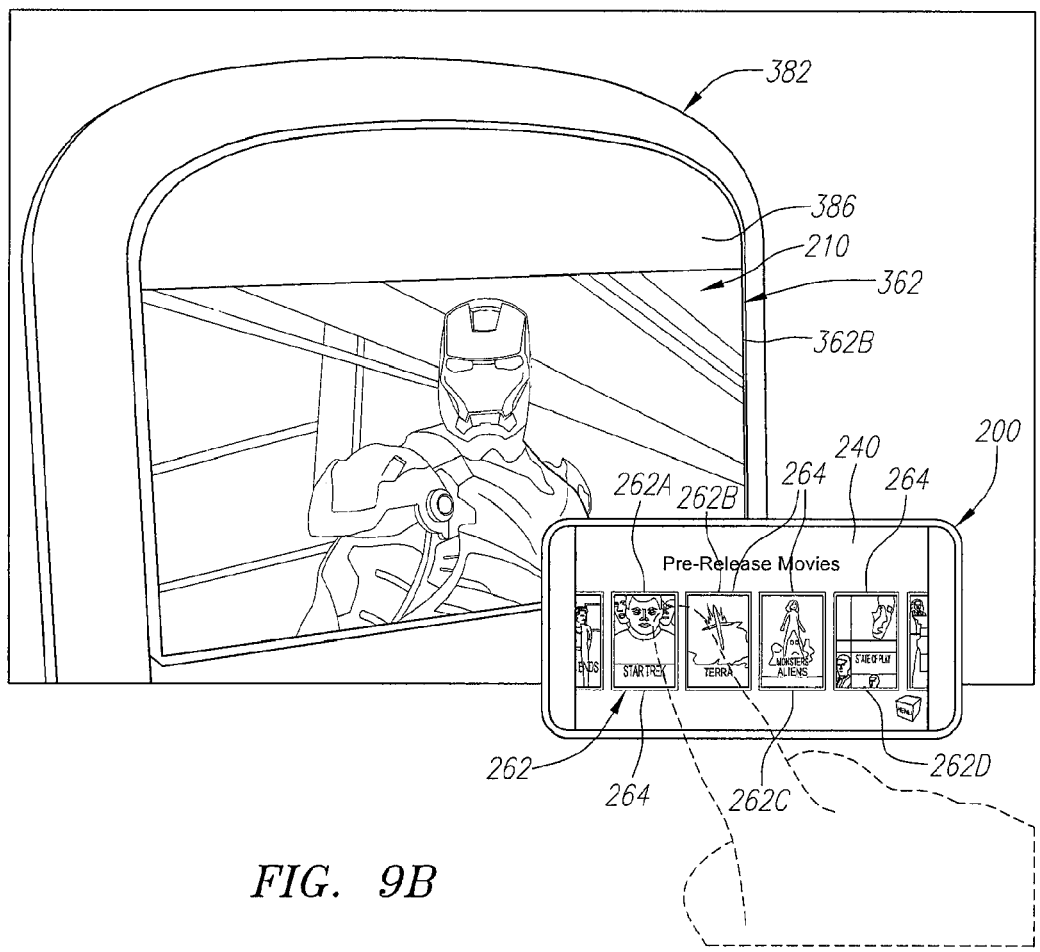
FIG. 9B is an exemplary detail drawing illustrating an alternative embodiment of an application of the portable control device of FIGS. 8A-E, wherein the portable control device supports a dual display for multitasking.

FIG. 9B illustrates another application of the personal user control device 200. As illustrated in FIG. 9B, preselected viewing content 210 can be presented via a video interface system 362, such as a seatback display system 362B disposed on an adjacent passenger seat 382. During presentation of the preselected viewing content 210, a passenger (or user) may wish to access one or more other system functions supported by the information system 100 (shown in FIG. 1) and/or vehicle information system 300 (shown in FIGS. 2A-B) that is providing the preselected viewing content 210. The personal user control device 200 advantageously can be provided to enable the system functions while continuing to view the preselected viewing content 210 on the video interface system 362. In other words, the personal user control device 200 can enable the user to multitask by taking advantage of the integrated video display system 240 of the personal user control device 200. Although discussing the multitasking feature of the personal user control device 200 with reference to preselected viewing content 210 for purposes of illustration only, the video interface system 362 can present any suitable type of information content, including the different perspective views of the game indicia and the exposed game elements of the multiplayer poker game 900, as the personal user control device 200 attempts to access the other system functions.

The integrated video display system 240 of the personal user control device 200 can be utilized to present a menu system 262 for accessing the other system functions in the manner set forth in more detail above with reference to FIGS. 6A-D and 7A-F. As illustrated in FIG. 9B, the menu system 262 includes basic control selections 262A-D with identifying indicia 264 that identifies the respective control selections 262A-D. The basic control selections 262A-D, for example, are shown as comprising additional selections of available viewing content 210. The user thereby can browse the menu system 262 via the personal user control device 200 while continuing to view the preselected viewing content 210 on the video interface system 362. Although shown and described as presenting a menu system 262 for accessing the other system functions while presenting preselected viewing content 210 on the video interface system 362 for purposes of illustration only, the personal user control device 200 likewise can present the preselected viewing content 210 while the menu system 262 is shown on the video interface system 362.

Figure 9C:
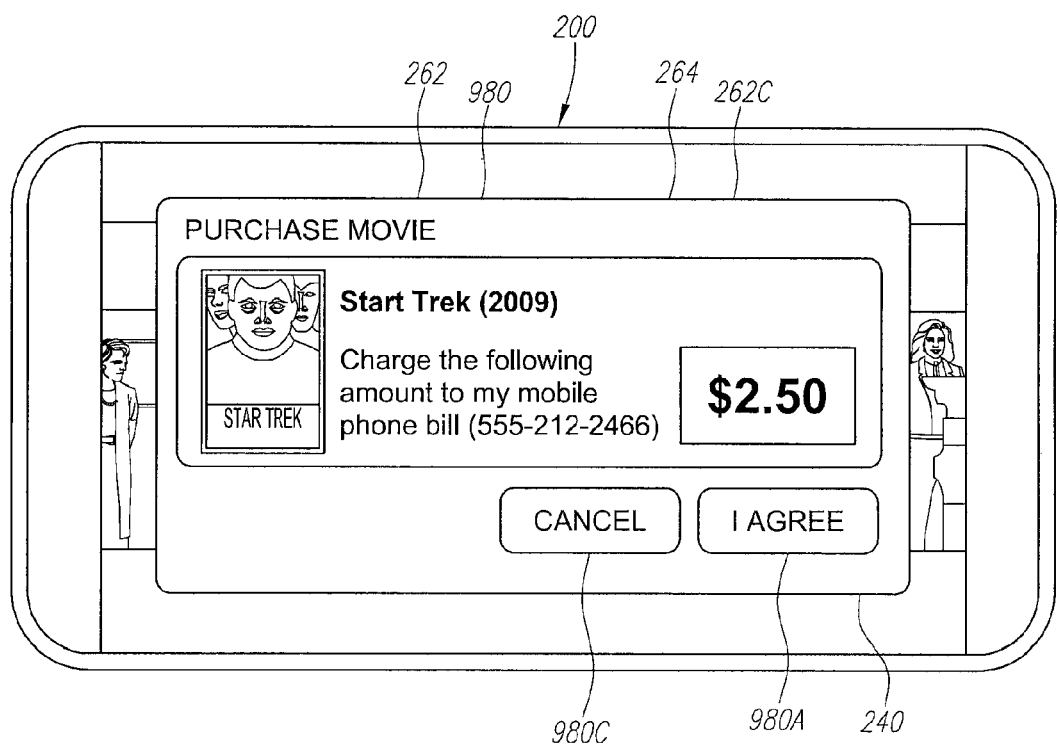
FIG. 9C is an exemplary detail drawing illustrating another alternative embodiment of an application of the portable control device of FIGS. 8A-E, wherein the portable control device supports transaction authentication.

Yet another useful application of the personal user control device 200 is illustrated in FIG. 9C. Turning to FIG. 9C, the personal user control device 200 can facilitate transaction authentications. The information system 100 (shown in FIG. 1) and/or vehicle information system 300 (shown in FIGS. 2A-B) sometimes requires payment of a fee or some other form of authentication prior to permitting access one or more supported system functions. For example, passengers in a first passenger group, such as a first class and/or business class of a passenger cabin 380 (shown in FIGS. 4A-B) of a passenger vehicle 390 (shown in FIGS. 4A-B), may be able to access all of the viewing content 210 that is available via the vehicle information system 300 without payment of a fee; whereas, passengers in a second passenger group, such as a coach class and/or economy class of the passenger cabin 380, may be required to pay the fee before being granted access to the viewing content 210. In one embodiment, the passengers in the second passenger group may be provided with free access to standard viewing content 210 while being required to make payment of the fee to receive access to premium viewing content 210.

When payment of a fee or any other form of access authorization is required for access to a selected system function, the personal user control device 200 can help facilitate payment of the fee. In the manner set forth in more detail above with reference to FIG. 9B, the integrated video display system 240 of the personal user control device 200 can present a menu system 262 that includes basic control selections 262A-D (shown in FIG. 9B) with identifying indicia 264 that identifies the respective control selections 262A-D. As illustrated in FIG. 9C, the personal user control device 200 can be used to select the control selection 262C. The identifying indicia 264 associated with the control selection 262C are shown as including an authorization request 980.

The authorization request 980 includes the amount of any payment required and can provide one or more conventional options for authorizing the payment, including payment via a credit card, debit card, and/or mobile telephone account. Upon activating the "I AGREE" button 980A, the passenger has authorized the payment and is granted access to the selected viewing content 210 associated with the control selection 262C; otherwise, the passenger can decline to make the payment by activating the "CANCEL" button 980C and will be denied access to the selected viewing content 210. Although discussing the transaction authorization feature of the personal user control device 200 with reference to preselected viewing content 210 for purposes of illustration only, the personal user control device 200 can support transaction authorizations for any system function available via the information system 100 (shown in FIG. 1) and/or vehicle information system 300 (shown in FIGS. 2A-B), including access to the multiplayer poker game 900.

Figure 10A:
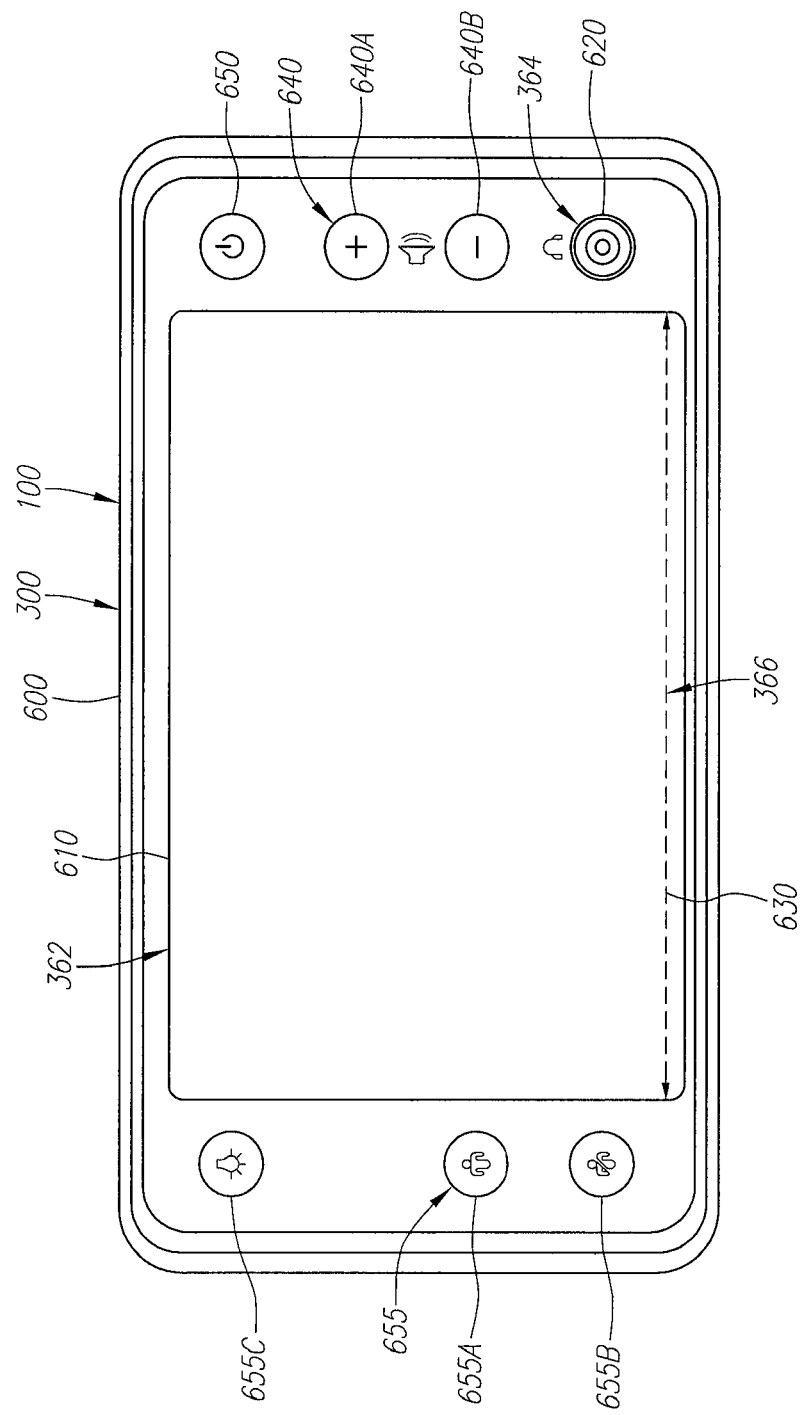
FIG. 10A is an exemplary detail drawing illustrating an embodiment of an integrated audio/video presentation system for the vehicle information system of FIGS. 2A-B.
Figure 10B:
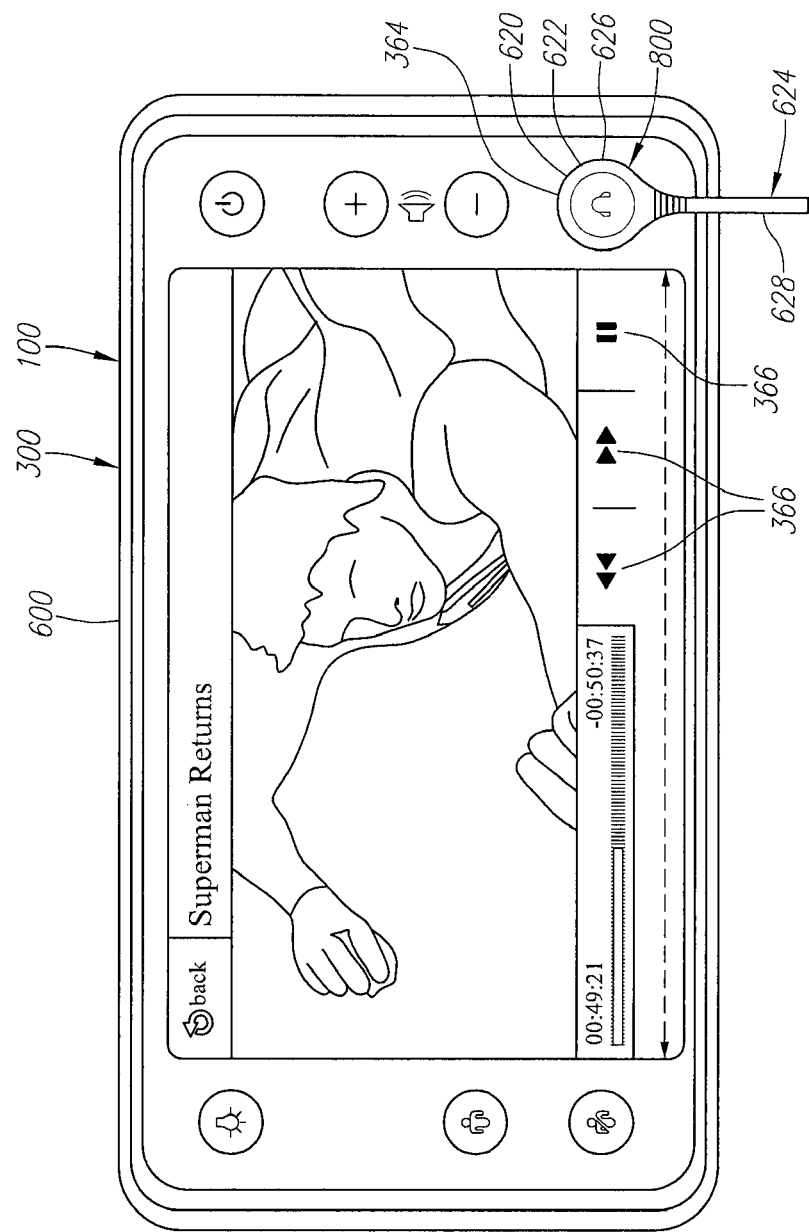
FIG. 10B is an exemplary detail drawing illustrating an embodiment of the integrated audio/video presentation system of FIG. 10A, wherein the integrated audio/video presentation system includes a break-away communication connector system for coupling a peripheral presentation system with the integrated audio/video presentation system.
Figure 10C:
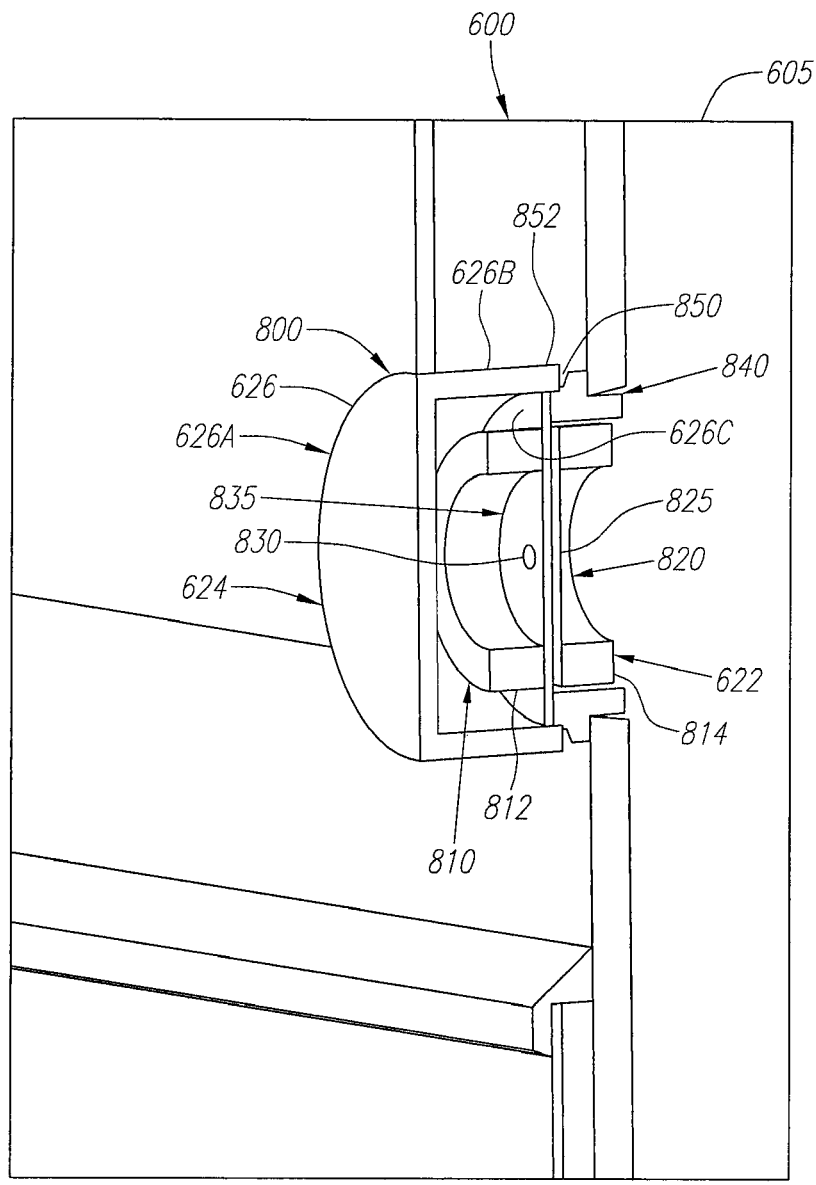
FIG. 10C is an exemplary detail drawing illustrating an embodiment of the break-away communication connector system of FIG. 10B.

Turning to FIGS. 10A-C, the video presentation system 362, the audio presentation system 364, and/or the input system 366 of the vehicle information system 300 can be provided as an integrated audio/video presentation system 600. The video presentation system 362 can include a viewing screen 610 disposed on the integrated audio/video presentation system 600, and one or more communication ports (or connectors or jacks) 620 are provided on the integrated audio/video presentation system 600 as a part of the input system 366. Thereby, when the vehicle information system 300 is in communication with the personal user control device 200 (shown in FIGS. 6A-D) via the communication port 620, selected viewing content 210 (shown in FIGS. 2A-B) provided by the vehicle information system 300 can be presented via the viewing screen 610 and/or the audio jacks 620 of the integrated audio/video presentation system 600. As desired, the integrated audio/video presentation system 600 likewise can include one or more other types of ports (or connectors or jacks) (not shown) for communicating with a peripheral video presentation system and/or a peripheral audio presentation system.

The integrated audio/video presentation system 600 can be provided in the manner set forth in more detail in the above-referenced related nonprovisional patent applications: "MEDIA DEVICE INTERFACE SYSTEM AND METHOD FOR VEHICLE INFORMATION SYSTEMS," Ser. No. 12/210,636, filed Sep. 15, 2008; and "MEDIA DEVICE INTERFACE SYSTEM AND METHOD FOR VEHICLE INFORMATION SYSTEMS," Ser. No. 12/210,652, filed Sep. 15, 2008. For example, the integrated audio/video presentation system 600 can provide enhanced viewing content presentation capabilities. For example, the audio presentation system 364 of the integrated audio/video presentation system 600 can include a conventional noise-cancellation system (not shown) for further improving sound quality of the viewing content 210.

When coupled with the integrated audio/video presentation system 600, the personal user control device 200 can select the viewing content 210 available via the vehicle information system 300 and/or control the manner by which the selected viewing content 210 is presented by the integrated audio/video presentation system 600. In other words, the personal user control device 200 can be associated with the input system 366 of the integrated audio/video presentation system 600. FIG. 10A shows that the input system 366 of the integrated audio/video presentation system 600 likewise can include one or more user controls that are provided in any suitable arrangement. For instance, the input system 366 can include a video control system 630 for controlling the playback of the viewing content 210 (shown in FIGS. 2A-B).

An exemplary audio control system 640 of the input system 366 is shown as being a volume control system with a first button 640A for increasing the volume of an audio portion of the viewing content 210 and/or a second button 640B for decreasing the volume of the audio portion. As desired, the input system 366 of the integrated audio/video presentation system 600 can include at least one other user controls. The integrated audio/video presentation system 600 of FIG. 6A is shown as having a power control system 650, such as an on/off button. If installed aboard a passenger vehicle, the integrated audio/video presentation system 600 likewise can include an onboard services control system 655 for controlling one or more onboard passenger services. The onboard services control system 655 is illustrated in FIG. 6A as including a flight attendant call button 655A, a cancel flight attendant call button 655B, and/or a seat lighting system control button 655C.

As shown in FIG. 10B, the input system 366 of the integrated audio/video presentation system 600 can include at least one break-away communication connector system 800. The break-away communication connector system 800 can removably couple the personal user control device 200 with the integrated audio/video presentation system 600. The break-away communication connector system 800 advantageously facilitates replacement of broken communication jacks, while readily separating from the integrated audio/video presentation system 600 to ensure passenger safety should an emergency arise. In a preferred embodiment, the break-away communication connector system 800 can provide operating power to the personal user control device 200.

As shown in FIG. 10B, a communication cable 628 with a suitable cable length and can be terminated with a peripheral communication connector (or port) 626. The peripheral communication connector 626 can cooperate (or removably couple) with a system communication connector (or port) 622 of the integrated audio/video presentation system 600. The communication connectors 622, 626 are nonfixedly coupled and, if necessary, can readily separate, forming the break-away communication connector system 800. The personal user control device 200 and the integrated audio/video presentation system 600 thereby can communicate via the break-away communication connector system 800.

Although shown and described as coupling the personal user control device 200 with the integrated audio/video presentation system 600 for purposes of illustration only, the break-away communication connector system 800 can be employed to couple any conventional type of peripheral presentation system, including peripheral video presentation systems and/or peripheral audio presentation systems, with the information system 100 and can be disposed on any suitable mounting surface. In other words, if the information system 100 is installed aboard a vehicles 390 (shown in FIGS. 2A-B), the break-away communication connector system 800 can be provided at any suitable passenger cabin surface, such as a seatback 386 (shown in FIGS. 4A-B), an armrest 388 (shown in FIGS. 2A-B), a wall 396 (shown in FIGS. 4A-B), a ceiling, and/or a bulkhead.

The break-away communication connector system 800 preferably employs a magnetic system 810 for providing a magnetic coupling between the communication connectors 622, 626 as illustrated in FIG. 10C. Turning to FIG. 10C, the system communication connector 622 of the integrated audio/video presentation system 600 can include a plurality of system contacts 820 and a system magnet system 814. The system contacts 820 and the system magnet system 814 preferably are disposed within a housing assembly 605 of the integrated audio/video presentation system 600. For example, the system contacts 820 and the system magnet system 814 can be provided within a system bezel 840 recessed within the housing assembly 605.

The peripheral communication connector 626 similarly can be provided as a plurality of peripheral contacts 830 and a peripheral magnet system 812. When the communication connectors 622, 626 are coupled, the peripheral contacts 830 are configured to cooperate with the system contacts 820; whereas, the system magnet system 814 and the peripheral magnet system 812 are configured to cooperate. As shown in FIG. 10C, the peripheral contacts 830 and the peripheral magnet system 812 can be disposed within a peripheral connector housing 626A. The peripheral connector housing 626A preferably includes at least one mating peripheral mating surface 626B that is configured to cooperate with at least one mating system surface 850 of the housing assembly 605 of the integrated audio/video presentation system 600. Thereby, when the peripheral communication connector 626 is coupled with the integrated audio/video presentation system 600, the mating peripheral mating surface 626B cooperates the mating system surface 850 to help ensure a proper alignment between the system contacts 820 and the peripheral contacts 830 and/or between the peripheral magnet system 812 and the system magnet system 814.

The mating system surface 850, for example, can form a recess (not shown) for receiving the mating peripheral mating surface 626B and/or an extension 852 that can be received within an opening 626C formed by the mating peripheral mating surface 626B as shown in FIG. 10C. As desired, the mating surfaces 626B, 850 can provide via one or more sets of cooperating detents for coupling the peripheral connector housing 626 and the housing assembly 605. The term "detents" refers to any combination of mating elements, such as blocks, tabs, pockets, slots, ramps, locking pins, cantilevered members, support pins, and the like, that may be selectively or automatically engaged and/or disengaged to couple or decouple the peripheral connector housing 626 and the housing assembly 605. It will be appreciated that the cooperating detents as illustrated and described below are merely exemplary and not exhaustive. Accordingly, the break-away communication connector system 800 advantageously supports electrical communication between the peripheral contacts 830 of the peripheral communication connector 626 and the system contacts 820 of the system communication connector 622 while permitting the peripheral communication connector 626 to readily separate from the system communication connector 622 to ensure passenger safety should an emergency arise.

In a preferred embodiment, the system contacts 820 can be provided on a system printed circuit board (PCB) assembly 825, and/or the peripheral contacts 830 can be provided on a peripheral printed circuit board (PCB) assembly 835. The break-away communication connector system 800 thereby can advantageously provide a flat surface-to-surface contact between the communication connectors 622, 626. The PCB assembly 825 and the peripheral PCB assembly 835 can be provided in any convention manner and preferably are provided as flat flexible printed circuit board (PCB) assemblies. If provided as a flat flexible PCB assembly, the peripheral PCB assembly 835 can be used to connect audio conductors within the communication cable 628 (shown in FIG. 10B) to the peripheral communication connector 626 of the peripheral audio presentation system 624. Discrete wiring (not shown) likewise can be used as desired. When the video interface system 362 (shown in FIGS. 4A-B) is provided as a touchscreen display system, for example, the touchscreen display system may need to define an internal physical space to accommodate wiring associated with the system communication connector 622. Use of a flat flexible PCB assembly with the system communication connector 622 advantageously permits the internal physical space to be minimized.

The system contacts 820 of the system communication connector 622 can be disposed on the system PCB assembly 825 in any conventional manner or contact arrangement. Similarly, the peripheral contacts 830 of the peripheral communication connector 626 can be disposed on the peripheral PCB assembly 835 in any conventional manner or contact arrangement. The peripheral contacts 830 are configured to cooperate (or communicate) with the system contacts 820 when the system communication connector 622 and the peripheral communication connector 626 are coupled. In other words, the system contacts 820 of the system communication connector 622 and the peripheral contacts 830 of the associated peripheral communication connector 626 preferably are provided with the same contact arrangement.

Exemplary contact arrangements for the system contacts 820 and the peripheral contacts 830 are illustrated in FIGS. 11A-G. Although shown and described with reference to the system contacts 820 of the system communication connector 622 for purposes of illustration only, the exemplary contact arrangements can equally apply to the peripheral contacts 830 of the peripheral communication connector 626. The exemplary contact arrangements as shown and described herein are not exhaustive and are provided herein for purposes of illustration only and not for purposes of limitation.

Turning to FIG. 11A, the system contacts 820 of the system communication connector 622 can be provided with a concentric (or bull's eye) contact arrangement. The contact arrangement of FIG. 11A includes a central system contact 826 disposed within one or more circular-shaped system contacts 822, 824. The circular-shaped system contacts 822, 824 can be provided with uniform system contact widths as illustrated with system contacts 824 and/or different system contact widths as illustrated with system contacts 822, 824. In other words, the contact arrangement of the system contacts 820 can be provided with any suitable cross-section. As shown in FIG. 11A, selected circular-shaped system contacts 824 can form a single (or continuous) contact in the shape of a complete circle, and/or selected circular-shaped system contacts 822 can comprise two or more contacts 822A, 822B in the shape of a semi-circle. A spacing between adjacent system contacts 822, 824, 826 can be uniform as illustrated in FIG. 11A and/or different as illustrated in FIG. 11B. Thereby, the system communication connector 622 advantageously leverages the continuous contact surfaces of the system contacts 822, 824, 826 of the concentric contact arrangement of FIG. 11A to help ensure that contact is made for each of the system contacts 822, 824, 826.

The system contacts 822, 824, 826 of the concentric contact arrangement shown in FIG. 11A provides sufficient system contacts 820 to support peripheral audio presentation devices 624 (shown in FIG. 7A), including powered peripheral audio presentation devices such as noise-canceling headphones. The system communication connector 622 (shown in FIGS. 7A-B) thereby can provide sufficient system contacts 820 to support the signaling and operating power requirements of the powered peripheral audio presentation device, while leaving the possibility for the device communication connector 626 (shown in FIGS. 7A-B) to be revolved through at least one complete rotation relative to the system communication connector 622 in any direction. The concentric contact arrangement of the system contacts 822, 824, 826 can provide consistent performance for all connector geometries.

The system contacts 820 alternatively, or additionally, can be provided with the concentric (or bull's eye) contact arrangement shown in FIG. 11C. Turning to FIG. 11C, the contact arrangement includes a central system contact 826 disposed within one or more semicircular-shaped system contacts 822, 824 in the manner set forth in more detail above with reference to the contact arrangement of FIG. 11A. As set forth above, the semicircular-shaped system contacts 822, 824 can be provided with uniform system contact widths as illustrated with system contacts 824 and/or different system contact widths as illustrated with system contacts 822, 824. A spacing between adjacent system contacts 822, 824, 826 can be uniform, as illustrated in FIG. 11C, or different as illustrated in FIG. 11D.

The system contacts 822, 824, 826 can be provided with any suitable contact arrangements and/or geometries. For example, FIG. 11E illustrates that a contact arrangement for the system contacts 820, wherein the contact arrangement includes a plurality of straight central system contacts 824 disposed within one or more circular-shaped system contacts 822. The circular-shaped system contacts 822 can be provided in the manner set forth in more detail above with reference to the contact arrangement of FIG. 11A. The straight central system contacts 824 are provided as a parallel arrangement of system contacts 824.

Turning to FIG. 11F, the illustrated contact arrangement includes a central system contact 826 disposed within one or more circular-shaped system contacts 822. A plurality of internal system contacts 824 are shown as being disposed around the central system contact 826 and within the circular-shaped system contacts 822. The internal system contacts 824 can be uniformly disposed about the central system contact 826, as shown in FIG. 11F, and/or unevenly disposed about the central system contact 826. The central system contact 826 and the internal system contacts 824 can be provided with any desired geometrical shape and/or size. As shown in FIG. 11F, for example, the central system contact 826 and the internal system contacts 824 each are provided as round system contacts. The internal system contacts 824 are shown as being provided as pie-shaped system contacts in FIG. 11G.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A multiplayer gaming system for enabling passengers traveling aboard a passenger vehicle to participate in a multiplayer game having game indicia and a plurality of game elements including one or more exposed game elements and at least one concealed game element associated with each passenger participating in the multiplayer game, comprising:
   a plurality of video interface systems being disposed at respective passenger seats aboard the passenger vehicle and for presenting different perspective views of the game indicia and the exposed game elements to each of the participating passengers to simulate an experience of natural participation in a tangible game; and
   a plurality of passenger control devices being provided at the respective passenger seats, each of said passenger control devices being associated with a selected video interface system and including a touchscreen display system disposed upon a handheld housing having a game controller interface portion with at least one button region,
   wherein said touchscreen display system and said one of the plurality of video interface systems form a customized game interface for privately presenting the concealed game element to a relevant participating passenger via the touchscreen display while inhibiting other participating passengers from viewing the concealed game element and for enabling the relevant participating passenger to actively control his participation in the multiplayer game by mapping a predetermined function with a predetermined location of said touchscreen display system and initiating the predetermined function upon activation of a relevant button region associated with the predetermined location.

2. The multiplayer gaining system of claim 1, wherein the multiplayer game is selected from a group consisting of a card game, a board game, an arcade game, and a computer game.

3. The multiplayer gaming system of claim 2,
   wherein the multiplayer game comprises a poker game,
   wherein the game indicia includes a virtual poker table and avatars of the other participating passengers,
   wherein the exposed game elements comprise poker chips and upcards, and
   wherein the concealed game element includes a hole card.

4. The multiplayer gaming system of claim 1, wherein at least one of the video interface systems is selected from a group consisting of a seatback video display system disposed on a seatback of a selected passenger seat and an overhead video display system disposed above the selected passenger seat.

5. The multiplayer gaming system of claim 1, wherein said passenger control devices are sequentially activated for controlling participation in the multiplayer game and thereby inhibit the participating passengers from participating out of turn.

6. The multiplayer gaming system of claim 1, wherein the predetermined function is selected from a group consisting of receiving an additional game element from the plurality of game elements for private presentation via a selected passenger control device among the at least one concealed game element, discarding one or more of the at least one concealed game element presented via the selected passenger control device, and communicating with at least one other participating passenger.

7. The multiplayer gaming system of claim 6, wherein the customized game interface of the selected passenger control device presents indicia for identifying the predetermined function associated with the relevant button region.

8. The multiplayer gaming system of claim 7, wherein the indicia includes at least one of text and a symbol associated with the predetermined function.

9. The multiplayer gaming system of claim 6, wherein said communicating with at least one other participating passenger includes placing a wager on the multiplayer game, raising a prior wager on the multiplayer game, calling a prior wager on the multiplayer game, or ending participation in a current stage of the multiplayer game.

10. The multiplayer gaming system of claim 9,
wherein each participating passenger is associated with a plurality of virtual wagering tokens, and
wherein each of said video interface systems animates at least one of said placing the wager, said raising the prior wager, and said calling the prior wager by removing a suitable collection of one or more wagering tokens from the virtual wagering tokens associated with the selected passenger control device and moving the collection of wagering tokens into a common pot of wagering tokens.

11. The multiplayer gaming system of claim 6,
wherein the multiplayer game includes a virtual central game surface, and
wherein at least one of said video interface systems presents at least one of a path of the additional game element from the central game surface to the selected passenger control device, a path of the discarded game element from the selected passenger control device to the central game surface, and shadows of the game elements to enhance the simulated experience of natural participation in a tangible game.

12. The multiplayer gaming system of claim 1, wherein the touchscreen display system of a selected passenger control device displays a virtual covering for concealing the concealed game element and enables an associated participating passenger to at least partially remove the virtual covering to view at least a portion of the concealed game element by actuating a relevant portion of the touchscreen display system.

13. An information system suitable for installation aboard a passenger vehicle and for supporting a multiplayer gaming system for enabling passengers traveling aboard the passenger vehicle to participate in a multiplayer game having game indicia and a plurality of game elements including one or more exposed game elements and at least one concealed game element associated with each passenger participating in the multiplayer game, comprising:

a headend system for providing overall system control functions for the information system and for hosting the multiplayer game;

a plurality of video interface systems being disposed at respective passenger seats aboard the passenger vehicle and for presenting different perspective views of the game indicia and the exposed game elements to each of the participating passengers to simulate an experience of physically participating in a tangible game;

at least one access point;

a distribution system that communicates with said headend system, said video interface systems, and said access point; and a plurality of passenger control devices, each being associated with a respective video interface system, for communicating with said headend system via said access point and for privately presenting the concealed game element to a relevant participating passenger and for enabling the relevant participating passenger to actively control his participation in the multiplayer game.

14. The information system of claim 13, wherein said access point comprises a wireless access point for communicating with at least one of said passenger control devices in a wireless manner.

15. The information system of claim 13, wherein at least one of said passenger control devices supports downloading a customized game interface from said headend system.

16. The information system of claim 13, wherein each of said passenger control devices supports multitasking such that, while said video interface systems presents the different perspective views of the game indicia and the exposed game elements of the multiplayer game, said touchscreen display system of the selected passenger control device presents a menu system for accessing at least one additional function supported by said headend system.

17. The information system of claim 13, wherein a selected passenger control device initiates a transaction authorization for the associated participating passenger before granting access to the multiplayer game.

18. The information system of claim 17, wherein the selected passenger control device initiates the transaction authorization for the associated participating passenger who is traveling in an economy class of the passenger vehicle.

19. The information system of claim 17, wherein the selected passenger control device presents a menu system for facilitating entry of transaction authorization information by the associated participating passenger.

20. The information system of claim 13, wherein the vehicle information system is disposed within a fuselage of an aircraft.

* * * * *